United States Patent
Shastry

(10) Patent No.: US 8,768,853 B2
(45) Date of Patent: Jul. 1, 2014

(54) SECONDARY IDENTIFICATION FOR REMITTANCE DELIVERY

(75) Inventor: Vishwanath Shastry, Palo Alto, CA (US)

(73) Assignee: eBay Inc., San Jose, CA (US)

(*) Notice: Subject to any disclaimer, the term of this patent is extended or adjusted under 35 U.S.C. 154(b) by 1659 days.

(21) Appl. No.: 11/868,039

(22) Filed: Oct. 5, 2007

(65) Prior Publication Data

US 2009/0094163 A1 Apr. 9, 2009

(51) Int. Cl.
*G06Q 99/00* (2006.01)
*G06Q 20/10* (2012.01)

(52) U.S. Cl.
CPC .................................... *G06Q 20/10* (2013.01)
USPC .................................. 705/75; 705/39; 705/64

(58) Field of Classification Search
USPC ................................................ 705/39, 64, 75
See application file for complete search history.

(56) References Cited

U.S. PATENT DOCUMENTS

| | | | |
|---|---|---|---|
| 5,892,900 A | * | 4/1999 | Ginter et al. ................. 726/26 |
| 7,308,429 B1 | * | 12/2007 | Tozzi ................................ 705/39 |
| 2002/0185529 A1 | | 12/2002 | Cooper et al. |
| 2004/0088237 A1 | | 5/2004 | Moenickheim et al. |
| 2006/0248018 A1 | | 11/2006 | Song et al. |

FOREIGN PATENT DOCUMENTS

| | | |
|---|---|---|
| KR | 20010017972 | 3/2001 |
| WO | WO-2009048534 A2 | 4/2009 |
| WO | WO-2009048534 A3 | 4/2009 |

OTHER PUBLICATIONS

"International application serial No. PCT/US2008/011462, Search Report mailed Apr. 28, 2009", 4 pgs.
"International Application Serial No. PCT/US2008/011462, Written Opinion mailed Apr. 28, 2009", 4 pgs.

* cited by examiner

*Primary Examiner* — James D Nigh
(74) *Attorney, Agent, or Firm* — Schwegman, Lundberg & Woessner, P.A.

(57) ABSTRACT

There are provided a method, system and program storage device perform a remittance transaction. The method includes generating a remittance transaction to transfer funds from an account associated with a sender to a receiver; receiving a visual or audio identification of the receiver from the sender for the remittance transaction; and transmitting the generated remittance transaction, the received identification and the funds associated with the remittance transaction to a disbursement agent to selectively disburse funds to the receiver if the identification of the receiver matches the receiver.

18 Claims, 17 Drawing Sheets

SECONDARY IDENTIFICATION FOR REMITTANCE DELIVERY

TECHNICAL FIELD

This disclosure relates generally to data processing systems. More particularly, example embodiments are directed to remittances in a data processing systems.

BACKGROUND

In the financial services marketplace, a remittance is generally a financial transfer or payment (e.g., cash, check, electronic transfer) from one party (or party's account) to another party (or party's account). The financial services marketplace for transferring remittances includes a few large services companies (such as Western Union and Money Gram) and a number of other companies. This marketplace is experiencing substantial growth in all respects: the volume of remittances transferred, the number of service companies, the diversity of services they provide, and the entry of non-traditional service companies, such as the U.S. Postal Service and various credit unions.

Remittances are sent in various ways thought the world, such as through banks, money transfer service companies (e.g., Western Union, MoneyGram), postal services (e.g., U.S. Postal Service), and online service companies (e.g., Xoom), or they may be hand-delivered by the actual sender or by a third party apart from banks, money transfer service companies or postal offices. Companies such as PayPal are providing the ability to send money electronically between PayPal accounts via "send money" functionality.

Generally, to receive a remittance (e.g., money) transmitted from a sender to a receiver via one of the foregoing brick and mortar service companies and the like, the receiver would need to pick up the remittance (e.g., money) at a service location associated with the service company. To do so, the receiver generally presents an identification (e.g., primary identification) that establishes the receivers identity before the service location would release the remittance that was transmitted by the sender. To receive money electronically via PayPal, for example, both the sender and the receiver would need to have electronic PayPal accounts that were originally set up for authorized access by the respective sender and receiver (e.g., primary identification), such as via username and password. Alternate secondary identification of the receiver (or receiver's account) may enhance the remittances services.

BRIEF DESCRIPTION OF THE DRAWINGS

Some embodiments are illustrated by way of example and not limitation in the figures of the accompanying drawings in which.

DETAILED DESCRIPTION

An example system, method and machine-readable medium for performing a remittance transaction are described. In the following description, for the purposes of explanation, numerous specific details are set forth in order to provide a thorough understanding of example embodiments. It will be evident, however, to one skilled in the art that an example embodiment may be practiced without these specific details.

Example embodiments described herein include a system, a method, and a machine-readable medium for performing various remittance transactions using secondary identification. One method includes generating a remittance transaction to transfer funds from an account associated with a sender to a receiver; receiving a visual or audio identification of the receiver from the sender for the remittance transaction; and transmitting the generated remittance transaction, the received identification and the funds associated with the remittance transaction to a disbursement agent to selectively disburse funds to the receiver if the identification of the receiver matches the receiver.

Figure 1:
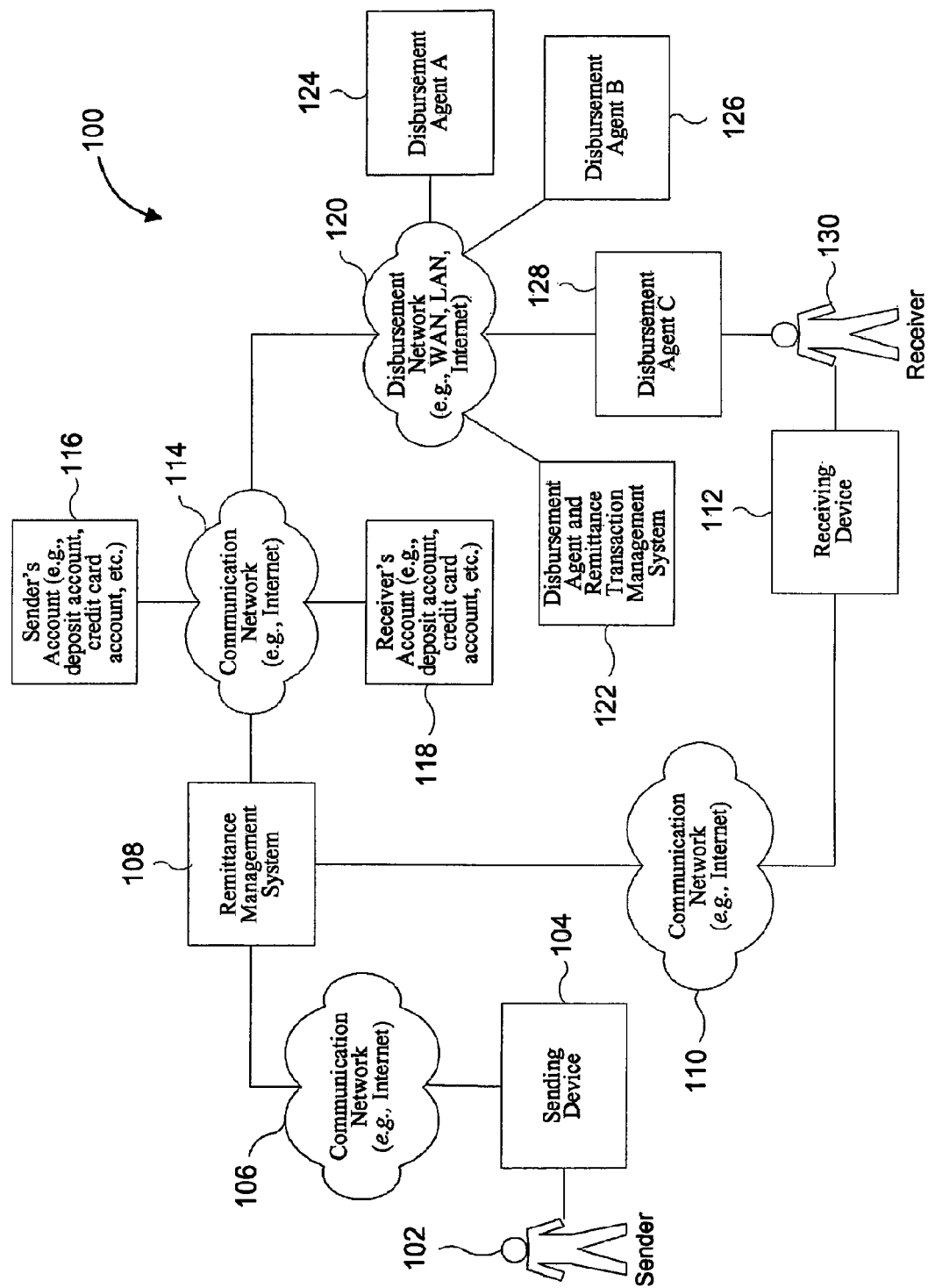
FIG. 1 is a block diagram of a remittance system for remitting funds (e.g., financial transfer or payment) between a sender (or sender's account(s)) and receiver 130 (or receiver's account(s))

FIG. 1 is a block diagram of a remittance system 100 for remitting funds (e.g., financial transfer or payment) between a sender 102 (or sender's account(s), such as account 116) and receiver 130 (or receiver's account(s), such as account 118). A variety of remittance transactions including secondary identification will be described hereinbelow in reference to the remittance system 100, including a remittance transaction that transmits a picture of the receiver 130 to a disbursement agent 124, 126, 128 for verification, a remittance transaction that transmits a shared secret from the receiver 130 to the remittance management system for verification with a shared secret from the sender 102 or from the remittance management system 108, a remittance transaction that provides for real-time authentication in which a real-time picture or video is transmitted from the disbursement agent 124, 126, 128 to the sender's 102 sending device 104 for verification, as well as a remittance on call or a pay on call transaction in which the sender is telephonically connected to the receiver 130 at the time of initiating a remittance or pay transaction to the receiver 130.

Further with reference to FIG. 1, the remittance system 100 includes a sending device 104 associated with the sender 102 interconnected via communication network 106 to a remittance management system 108; remittance management system 108 interconnected via communication network 114 to respective sender account 116 (e.g., bank account, credit card account, stored value account, etc.) and receiver account 118 (e.g., bank account, credit card account, etc.); the remittance management system 108 further interconnected via disbursement network 120 to disbursement agent and remittance transaction management system 122 and plural disbursement agents 124, 126 and 128; and the remittance management system 108 interconnected via communication network 110 to receiving device 112 associated with the receiver 130.

Still further with reference to FIG. 1, the sending device 104 and the receiving device 112 may include a conventional or cellular telephone (e.g., web-enabled), a peer-to-peer call client (e.g., Skype call client), a peer-to-peer software client (e.g., Skype software client), a web interface client (e.g., Internet Explorer, etc.). The communication networks 106, 110, 114 and 120 may include any conventional network, including a public switched telephone network (PSTN), a cellular network, a peer-to-peer (P2P) network, the Internet, Wide Area Network (WAN), Metropolitan Area Network (MAN), Campus Area Network (CAN), Virtual Private Network (VPN), private switched network, Local Area Network (LAN), Home Area Network (HAN), wireless (802.11), satellite, as well as a different combinations thereof, and the like. The communication over the communication networks may be accomplished via a variety of different protocols, including transfer control protocol/Internet protocol (TCP/IP) and hyper text transfer protocol (HTTP), as well as other well known protocols.

Yet further with reference to FIG. 1, the remittance management system 108, the components of which will be described in greater detail with reference to FIG. 2, facilitates remittances (e.g., financial transfers or payments) between the sender 102 (or sender's account(s), such as account 116) and the receiver 130 (or receiver's account(s), such as account 118). As will be described in greater detail below, the remittance management system 108 includes a communication subsystem for communicating with the sending device 102 associated with the sender 104 and with the receiving device of 112 associated with the receiver 130 for a remittance transaction. The remittance management system 108 further includes a remittance subsystem that generates a remittance transaction in remittance system 100, provides authentication of the sender 102 and determination of the receiver for the remittance transaction, determines the source and availability of funds for the remittance transaction, and provides notification of the receiver 130 relating to the generated remittance transaction.

Additionally with reference to FIG. 1, the disbursement agent and transaction management system 122, the components of which will be described in greater detail with reference to FIG. 3, manages the distribution agents 124, 126, 128 within the disbursement network 120 and facilitates the distribution of remittances transactions, funds disbursement from the remittance management system 108, and sender identification within the remittance system 100. The plural disbursement agents 124, 126, 128 are managed by the disbursement agent and transaction management system 122 and are enabled to request and receive remittance transactions, receive distribution of funds and disburse funds to one or more receivers 130. For clarity and simplicity of the figures and associated description, only one sender 102, one receiver 130, one remittance management system 108, one of each sender's and receiver banks 116, 118, and one disbursement agent and transaction management system 122 are shown. It should be noted, however, that the remittance system 100 is scalable and may include multiple components of each of the foregoing system component. For example, there may be multiple disbursement agent and transaction management systems 122, each of which manages distribution of remittance transactions, funds disbursements and receiver identification of multiple disbursement agents, such as disbursement agents 124, 126, 128.

Figure 2:
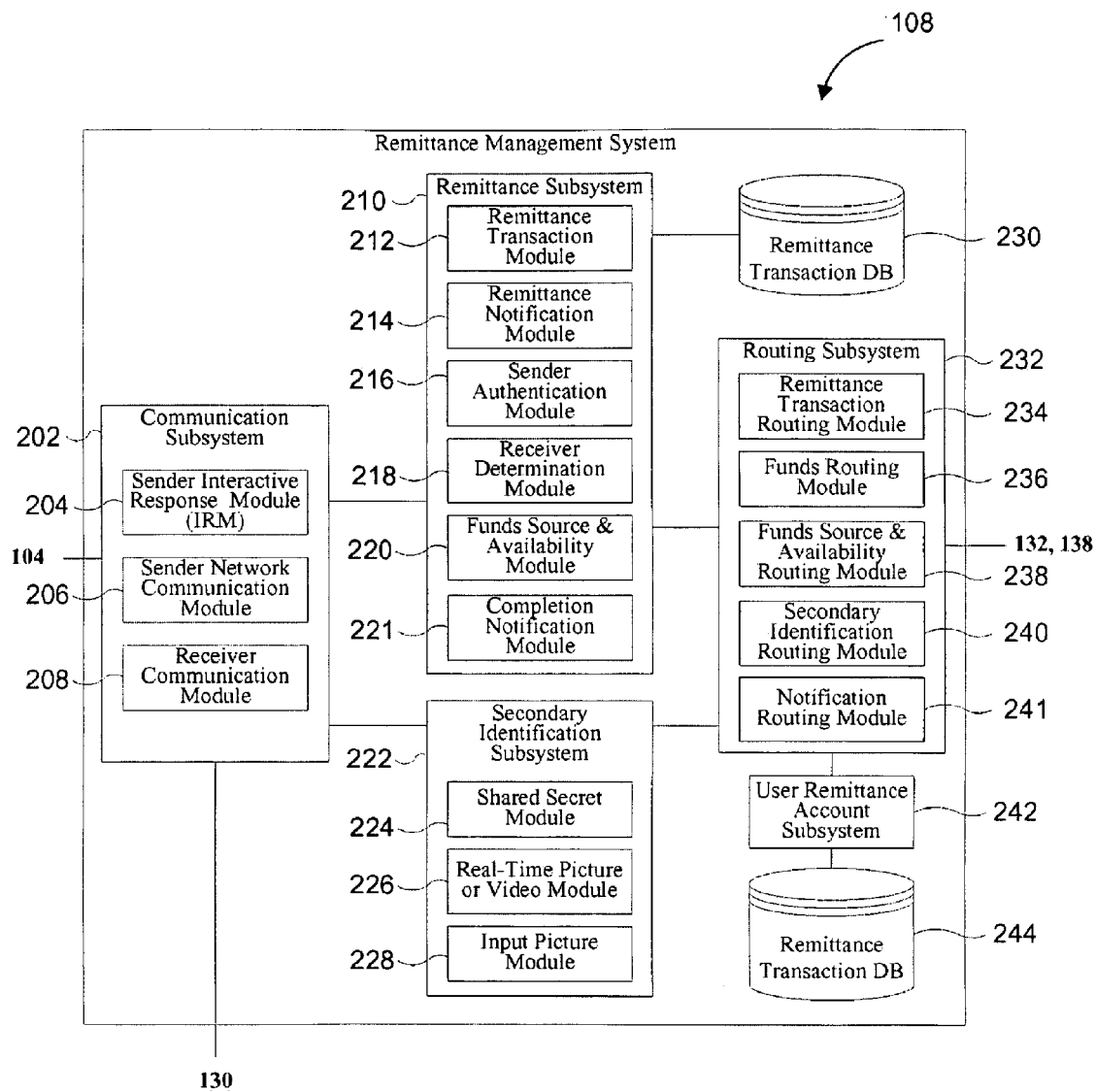
FIG. 2 is an example exploded block diagram of an example remittance management system of FIG. 1.

FIG. 2 is an example exploded block diagram of the example remittance management system 108 of FIG. 1. The remittance management system 108 includes a communication subsystem 202, a remittance subsystem 210, a secondary identification subsystem 222, remittance transaction database 230, routing subsystem 232 and user remittance accounts 242. The communication subsystem 204 includes a sender interactive response module 204, a sender network communication module 206, and a receiver communication module 208 to interconnect the sender's 102 sending device 104 with the remittance management system 108, the remittance management system 108 with receiver's 130 receiving device 112, as well as the sender's sending device 104 with the receiver's 130 receiving device 112, as particularly illustrated in FIG. 1 hereinabove. More specifically, the sender interactive response module 204 (e.g., voice and touch tone) enables the sender 102 to use a conventional telephone or a cellular telephone as sending device 104 to perform remittance transactions as described herein via voice commands and/or touch tone commands using the telephone keypad. The sender network communication module 206 enables the sender 102 to use a web-enabled personal computer, personal digital assistant (PDA), and cellular telephone, and the like, as sending device 104 to communicate with the remittance management system in order to perform remittance transactions as described herein. The receiver communication module 208 enables the sender 102 to use a conventional telephone, a cellular telephone, a web-enabled personal computer, personal digital assistant (PDA), cellular telephone, or the like, as receiving device 112 to communicate with the remittance management system 108 for remittance transactions described herein. The receiver communication module 208 may also enable communication of sender 102 with the disbursement agent and remittance transaction management system 122 and/or disbursement agents 124, 126, 128.

Further with reference to FIG. 2, the remittance subsystem 210 includes a remittance transaction module 212, a remittance notification module 215, a sender authentication module 216, a receiver determination module 218, and a funds source and availability module 220. Based on sender 102 input via the communication subsystem 202, the remittance transaction module 212 may generate or initiate a remittance transaction from the sender 102 (or sender's account 116, 242) to the receiver 130 (or receiver's account 118, 242), which may be stored in the remittance transaction database 230. The remittance transaction may include sender-related information (e.g., name, address, telephone, email, and the like), receiver-related information (e.g., name, address, telephone, email, and the like), source and amount of funds information (e.g., bank account, credit card information, user account information, etc.). In addition to the foregoing information, the following information may also be included in the remittance transaction: sender and/or receiver social security number or national identification numbers (including driver's license numbers), date of birth, cellular telephone number/identifier, IP address/cookie/globally unique identifier (GUID) information for sending device 104 (e.g., computer/network enabled device), receiving agent location and details. The remittance notification module 214 may notify the receiver 130 and/or the sender 104 via communication subsystem 202 (e.g., via respective devices 104, 112) relating to a scheduled remittance transaction. The sender authentication module 216 authenticates the sender 102 via communication subsystem 202 before generating or initiating a remittance transaction. More specifically, the sender 102 may input login or authentication information (e.g., username and password) via the sending device 104 for transmission to the remittance management system 108. The password may be a biometric key (e.g., a thumbprint, a typing pattern, and the like). In addition to the username and password, the authentication information may also include a personal identification number (PIN), such as a PIN generated via token (e.g., PayPal security key), or a PIN set by sender 102 at the time the sender's account was created. A PIN may also serve as a replacement for a password. The authentication information may be a biometric input, such as a thumbprint, a typing pattern, and the like. The authentication information may also be (or may additionally include) information associated with the sender's 102 sending device 104, such as device specific identification and password. More specifically, the device identification may be a caller ID (e.g., telephone sending device 104) or unique identifier (e.g., software generated unique identifier that may be stored in an application or web cookie) such as GUID (globally unique identifier). Lastly, device specific information may also include a PIN, such as a PIN generated via token (e.g., PayPal security key). The receiver determination module 218 determines the receiver 130 for the generated remittance transaction. The funds source and availability module 220 verifies whether a source funds inputted by a sender 102 for a remittance transaction belongs to the sender 102 and confirms or determines whether the verified source of funds contains sufficient funds entered by the sender 102 for the remittance transaction. Once the remittance transaction has been generated or initiated successfully (e.g., sender is authenticated, receiver is determined and source of funds and amount confirmed), the routing subsystem 232 routes the remittance transaction to the disbursement agent and transaction management system 122, as will be described hereinafter in greater detail. The completion notification module 221 receives completion or failure notification from disbursement agent and remittance transaction management system 122 and further transmits the notification to the sender 102 (e.g., sending device 014 associated with sender 102) via communication subsystem 202.

Still further with reference to FIG. 2, the secondary identification subsystem 222 includes a shared secret module 224, a real-time picture or video module 226 and an input picture module 228. The shared secret module 224 of FIG. 2 performs secondary identification of the receiver 130, and may perform sender-receiver shared secret (SRSS) secondary identification or a remittance system-receiver shared secret (RRSS) secondary identification. More specifically, the shared secret module 224 may match a SRSS of the sender 102 to the SRSS of the receiver 130, or may match a RRSS of the remittance management system 108 to the RRSS of the receiver 130. The SRSS may be unique information known only to the sender 102 and the recipient 130 (e.g., also to remittance management network 108 into which it is inputted). The SRSS may be a single piece of information, such as a word or phrase, a PIN, a picture, a real time video feed, a machine readable barcode, or multiple pieces of information, such as a question/answer pair. The RRSS is unique information known only to the remittance management system 108 and recipient 130. The RRSS may be the same pieces of information for the SRSS, a barcode or other machine generated image. The SRSS/RRSS may be transmitted form the remittance management system to the receiver 130 via receiving device 112 via communication network 110. The SRSS/RRSS will be transmitted from the sender 102 via network 106 and from the disbursement agent and transaction management network 122 via network 120 to the remittance management system 108 to facilitate secondary identification of the receiver 130. It should be noted, however, that it is also possible for the sender 102 to provide a SRSS to both remittance management system 108 and receiver 130 over different networks. For example, sender 102 may provide a PIN to the remittance management system 108 via an Internet based form, and may further provide the PIN to receiver 130 via a telephone. Because SRSS/RRSS authorize access to funds, the SRSS/RRSS may also be encrypted during transmission.

Yet further with reference to FIG. 2, upon a valid secondary identification (e.g., matching SRSS or RRSS) by the shared secret module 224, a remittance transaction may be completed (e.g., funds being disbursed to the receiver 130) by disbursement of funds to the disbursement agent 124, 126, 128 via the disbursement agent and transaction management system 122 as will be described hereinafter in greater detail. It is significant to note that the shared secret module 224 will transmit an allowance/denial of the remittance transaction based on the shared secret match, but the SRSS/RRSS are not transmitted to the disbursement agent and remittance transaction management system 122. However, it is also possible for the shared secret module 224 to transmit the actual shared secret (e.g., SRSS or RRSS) to the disbursement agent 124, 126, 128 and allow the disbursement agent to make the determination if the shared secret provided by receiver 130 matches the SRSS/RRSS. For example, shared secret module 224 may send a picture via secondary identification routing

240 to disbursement agent 124, 126, 128, and allow the disbursement agent to determine if the picture matches the receiver 130.

The real-time picture or video module 226 of FIG. 2 facilitates real-time secondary identification of the receiver 130 by the sender 102. More specifically, before funds are disbursed to the receiver 130, the disbursement agent 124, 126, 128 may transmit a real-time picture or video of the receiver 130 via the disbursement agent and transaction management system 122 and disbursement network 120 to the remittance management system 108. The real-time picture or video module 226 may further transmit the real-time picture or video of the receiver 130 via communication subsystem 202 to the sending device 102 for secondary identification by the sender 102 of the receiver 130. The real-time picture or video may be transmitted for secondary identification to the sender's 102 sending device 104, e.g., web-enabled cellular telephone, a peer-to-peer software client (e.g., Skype software client), web interface client (e.g., Internet Explorer, etc.) if the sender 102 is logged into the remittance management system 108 (e.g., available to receive the real-time video). For example, a web video conference may be initiated via a Skype software client or video displayed via a video interface of the web interface client. Alternatively, if the sender is not available, a predetermined portion of the time real-time picture or video may be attached to an email and emailed to an email account associated with the sender 102. Upon viewing the real-time picture or video, the sender 102 via sending device 104 may confirm or deny secondary identification of the receiver 130 to the remittance management system 108. The remittance management system 108 may receive such confirmation/denial via communication subsystem 202 and the real-time picture or video module 226 may further transmit such confirmation/denial to a routing subsystem 232 for funds routing (or denial of funds) to the disbursement agent and transaction management system 122 based on confirmation of the secondary identification.

The input picture module 228 of FIG. 2 facilitates secondary identification of the receiver 130. More specifically, in generating a remittance transaction, the sender 102 may provide via the sending device 104 a picture of the receiver 130 to the remittance management system 108. The input picture module 228 may receive the picture provided by the sender 102 and may further transmit the picture to a routing subsystem 232 for transmission to the disbursement agent 124, 126, 128 via disbursement agent and transaction management system 122. Upon receipt of the picture, the disbursement agent may confirm secondary identification of the receiver 130 before disbursing funds to the receiver 130. In an alternative embodiment, the input picture module 228 may receive the picture of receiver 130 from the sender 102 via communication subsystem 202 and from the disbursement agent 124, 126, 128 via routing subsystem 232, and may further perform image/facial recognition (or manual matching by a customer service representative) to confirm that the two images are similar. Such confirmation/denial may further be transmitted to the disbursement agent 124, 126, 128 via routing subsystem 232 to facilitate disbursement/non-disbursement of funds to the receiver 130. A voice input module (not shown) may perform similarly to the embodiments described in reference to the input picture module 228. More specifically, the voice input module may perform automated voice identification at the secondary identification subsystem 222. For example, the sender 102 may transmit an audio file of the receiver's 130 voice to remittance management system 108 and the disbursement agent 124, 126, 128 may record and transmit the receiver's 130 voice to remittance management system 108. The voice input module may then perform automated voice identification, and may further notify the disbursement agent 124, 126, 128 to allow or deny disbursement to the receiver 130.

Yet further with reference to FIG. 2, the routing subsystem 232 includes a remittance transaction routing module 234, a funds routing module 236, a funds source and availability routing module 238, and a receiver identification routing module 240. The routing subsystem 232 of FIG. 2 facilitates the routing of remittance transactions, availability requests of remittance transaction funds and remittance transaction funds, as well as receiver secondary identification to and from disbursement and transaction management system 122 and disbursement agent 124, 126, 128. The remittance transaction routing module 234 receives a remittance transaction generated by the remittance transaction module 212 or reads the remittance transaction from the remittance transaction database 230 and routes the remittance transaction to the disbursement agent and transaction database system 122 for ultimate delivery to a disbursement agent 124, 126, 128, or to the user account subsystem 242 for ultimate transfer of funds between user remittance accounts in user remittance accounts database 244. The funds routing module 236 routes funds collected from the sender (via one or more sender's accounts) and associated with the generated remittance transaction to the disbursement agent and transaction database system 122 for ultimate delivery to a disbursement agent 124, 126, 128. The funds source and availability routing module routes requests from funds source and availability module 220 to (and associated responses from) fund source(s) identified by the sender 102 for the remittance transaction. Upon funds being available, the funds routing module 236 may route funds to the disbursement agent and transaction network management system 122. The receiver identification routing module 240 routes secondary identification to/from the disbursement agent and transaction network management system 122 for ultimate delivery to or receipt from a disbursement agent 124, 126, 128.

Figure 3:
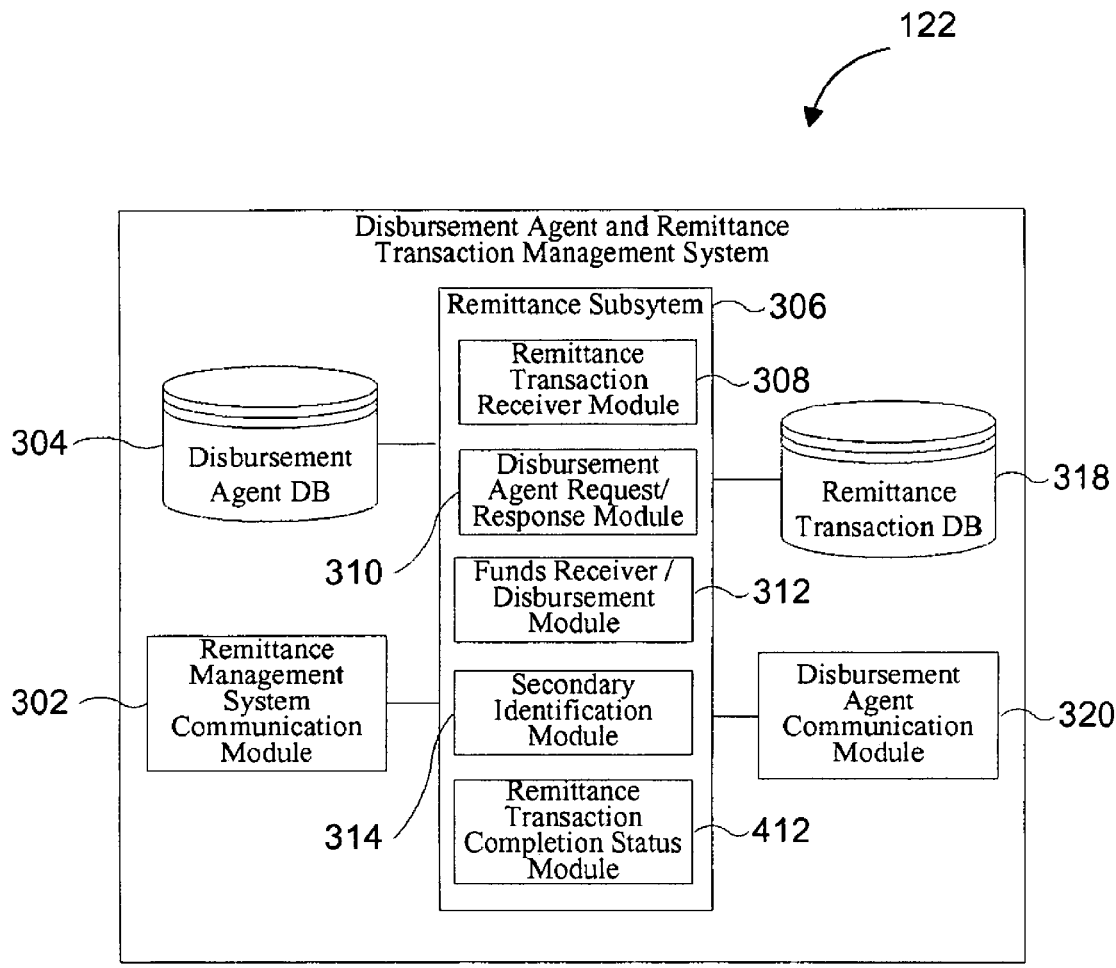
FIG. 3 is an example exploded block diagram of an example disbursement agent and remittance transaction management system of FIG. 1.

FIG. 3 is an example exploded block diagram of the example disbursement agent and remittance transaction management system 122 of FIG. 1. The disbursement agent and remittance transaction management system 122 includes a remittance management system communication module 302, a disbursement agent database 304, a remittance subsystem 306 a remittance transaction database 318 and a disbursement agent communication module 320. The remittance management system communication module 302 facilitates communication between the remittance management system and the disbursement agent and remittance transaction management system 122 over networks 114 and 120. The disbursement agent database 304 maintains disbursement one or more agents 124, 126, 128 associated with the disbursement agent and remittance transaction management system 122. The remittance transaction database 318 maintains remittance transactions for the one or more agents 124, 126, 128 maintained in the disbursement agent database 304. The disbursement agent communication module 302 facilitates communication between the disbursement agent and remittance transaction management system 122 and disbursement agents 124, 126, 128 over disbursement network 120.

Further with reference to the disbursement agent and remittance transaction management system 122 of FIG. 3, the remittance subsystem 306 includes a remittance transaction receiver module 308, a disbursement agent request/response module 310, a funds disbursement module 312, a secondary identification module 314 and a remittance transaction completion status module 316. The remittance transaction receiver module 308 receives a remittance transaction from the remittance management system 108 and stores the remittance transaction in remittance transaction database 318. The disbursement agent request/response module 310 may identify a particular disbursement agent 124, 126, 128 from the disbursement agent database 304 and may transmit the received remittance transaction to a disbursement agent 124, 126, 128 via the disbursement agent communication module 320 over disbursement network 120 without request for the remittance transaction by the disbursement agent 124, 126, 128. Alternatively, the disbursement agent request/response module may notify the identified disbursement agent 124, 126, 128 of the receipt of a remittance transaction and may await a request for the same. Upon receiving a request for the remittance transaction from the disbursement agent 124, 126, 128, the disbursement agent request/response module 310 may retrieve the remittance transaction from the remittance transaction database 318 and may further transmit the retrieved remittance transaction to the disbursement agent 124, 126, 128 via the disbursement agent communication module 320 over disbursement network 120. The funds disbursement module 312 may disburse remittance transaction funds received from the remittance management system 108 to the disbursement agent 124, 126, 128 upon receipt or upon confirmation of secondary identification received from the remittance management system 108. The secondary identification module 314 facilitates communication of various secondary identification described herein between the receiver 130 (via receiving device 112), disbursement agent 124, 126, 128, disbursement agent and remittance transaction management system 122, remittance management system 108 and sender 102 (via sending sender 104). The remittance transaction completion status module 316 receives remittance transaction completion status (e.g., completed/failed) from the disbursement agent 124, 126, 128 and transmits the same to the remittance management system 108.

Figure 4:
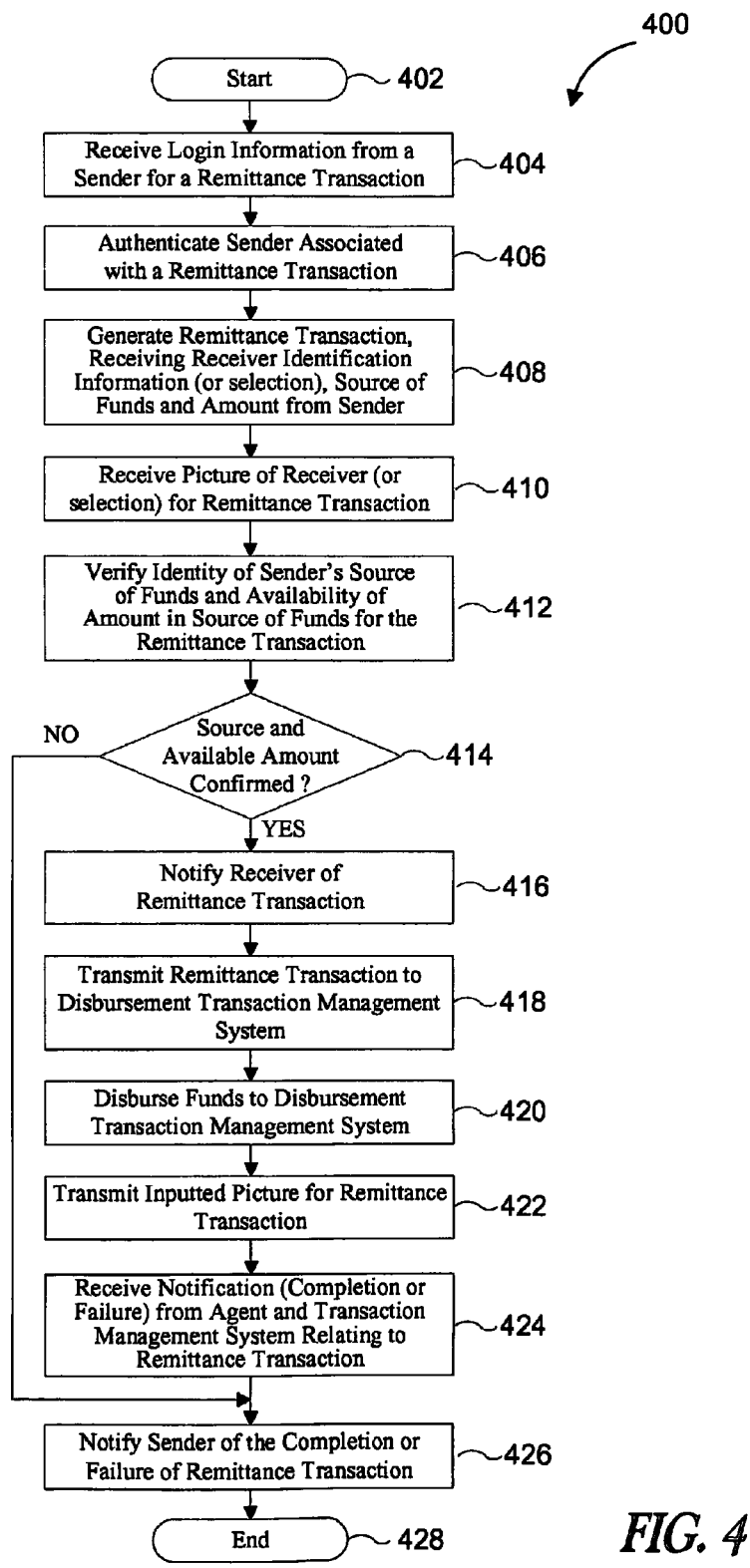
FIG. 4 is flowchart that illustrates an example method performed by the remittance management system for a remittance transaction using secondary identification of picture transmission in accordance with FIGS. 1-3.

FIG. 4 is flowchart that illustrates an example method 400 performed by the remittance management system 108 for a remittance transaction using secondary identification of picture transmission in accordance with FIGS. 1-3. The method 400 starts at operation 402. At operation 404, the sender authentication module 216 receives login or authentication information from the sender 102 via sending device 104 for a remittance transaction. As described above authentication information may include a combination of username, password, and/or a PIN entered by the sender 130 via sending device 104, or the authentication information may also be (or may additionally include) information associated with the sender's 102 sending device 104, such as device specific identification and password. More specifically, the device identification may be a caller ID (e.g., telephone sending device 104) or unique identifier (e.g., software generated unique identifier that may be stored in an application or web cookie) such as GUID (globally unique identifier). Lastly, device specific information may also include a PIN, such as a PIN generated via token (e.g., PayPal security key). At operation 406, the sender authentication module 216 authenticates the sender 102 using the foregoing login or authentication information for the remittance transaction. At operation 408, the remittance transaction module 212 generates a remittance transaction, receiving identification of receiver 130 or a prestored selection for receiver 130, a source of funds (e.g., user remittance account 244, sender bank account 116 that may be a bank account or a credit card account or the like) and an amount to be deducted or obtained from the source of funds associated with the remittance transaction. At operation 410, the input picture module 228 may also receive from the sender 102 a picture of the receiver 130 for secondary identification of the receiver 130. Thereafter, at operation 412, the funds source and availability module 220 verifies the identity of the sender's inputted source of funds and the availability of inputted amount in the source of funds for the remittance transaction. At operation 414 it is determined whether the source and an available amount for the remittance transaction are confirmed.

Further with reference to FIG. 4, if the source and the available amount are not confirmed at operation 414, the example method 400 continues at operation 424 at which the sender 102 is notified of the failure of the remittance transaction. If however at operation 414, the source and an available amount for the remittance transaction are confirmed, the example method 400 continues at operation 416 in which the remittance notification module 214 notifies the receiver 130 of the remittance transaction. The notification may be delivered by conventional telephone or cellular telephone call, SMS or other text/media messaging service, email, Internet based message board, or the like. The notification may also be delivered by conventional mail. The sender 102 may also be notified of the pending remittance transaction if desired. At operation 418, the remittance transaction routing module 234 transmits the generated remittance transaction to the disbursement agent and remittance transaction management system 122. At operation 420, the funds routing module 236 disburses funds associated with the remittance transaction to the disbursement agent and remittance transaction management system 122. At operation 422, the input picture module 228 transmits the inputted picture for the remittance transaction to the disbursement agent and remittance transaction management system 122. At operation 424, the notification routing module 241 receives notification (completion or failure status) from the disbursement agent and remittance transaction system 122 relating to the remittance transaction, routing the notification to the competition notification module 221, which at operation 426 notifies the sender 102 via sending device 104 of the completion status. The example method 400 ends at operation 428.

Figure 5:
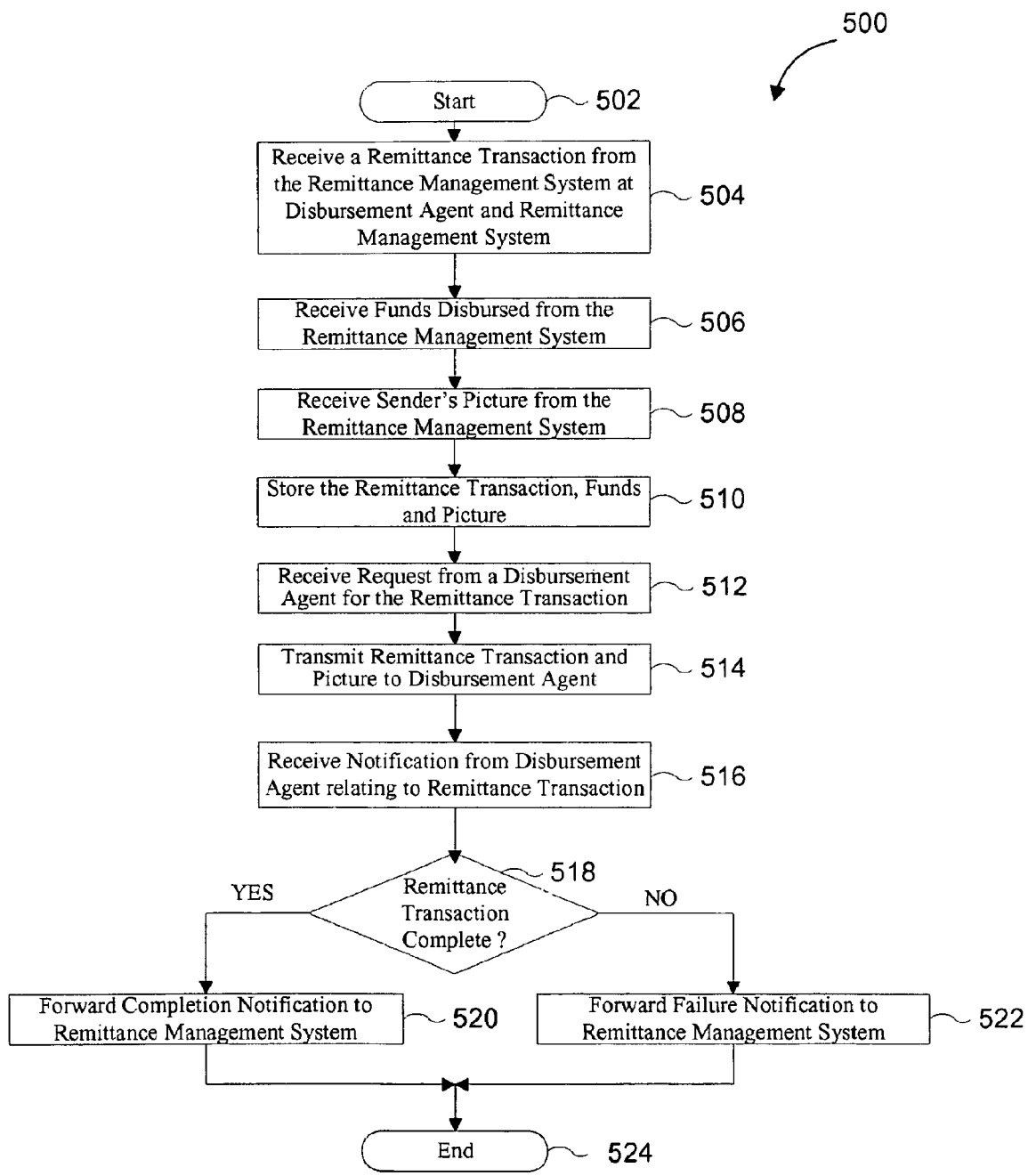
FIG. 5 is flowchart that illustrates an example method performed by the disbursement agent and remittance transaction system for a remittance transaction using secondary identification of picture transmission in accordance with FIGS. 1-4.

FIG. 5 is flowchart that illustrates an example method 500 performed by the disbursement agent and remittance transaction system 122 for a remittance transaction using secondary identification of picture transmission in accordance with FIGS. 1-4. The example method 500 starts at operation 502. At operation 504, the remittance transaction receiver module 308 receives a remittance transaction from the remittance management system 108. At operation 506, the funds receiver/disbursement module 312 receives funds for the remittance transaction disbursed from the remittance management system 108. At operation 508, the secondary identification module 314 receives the sender's 130 picture for the remittance transaction from the remittance management system 108. The received remittance transaction, disbursed funds and the picture are stored in the remittance transaction database 318 for the remittance transaction at operation 510. At operation 512, a request is received from a disbursement agent (e.g., disbursement agent 128) for the remittance transaction by the disbursement agent request/response module 310. Generally, the request is made at a time when the receiver 130 visits the disbursement agent 128 and requests funds to be disbursed. At operation 514, the disbursement agent request/response module 310 transmits the stored remittance transaction and the picture of the receiver 130 to the disbursement agent 128. Thereafter, at operation 516, the remittance transaction completion status module 316 receives notification from the disbursement agent 128 as to the completion or failure of the remittance transaction. At operation 518, the remittance transaction completion status module 316 determines whether the remittance transaction is complete (e.g., completion notification received). If remittance transaction is completed, the remittance transaction completion status module 316 forwards or transmits a completion notification to the remittance management system 108 at operation 520. Alternatively, if the remittance transaction is not complete (e.g., remittance transaction failed and funds not disbursed), the remittance transaction completion status module 316 forwards or transmits a failure notification to the remittance management system 108 at operation 522. The example method 500 ends at operation 524.

Figure 6:
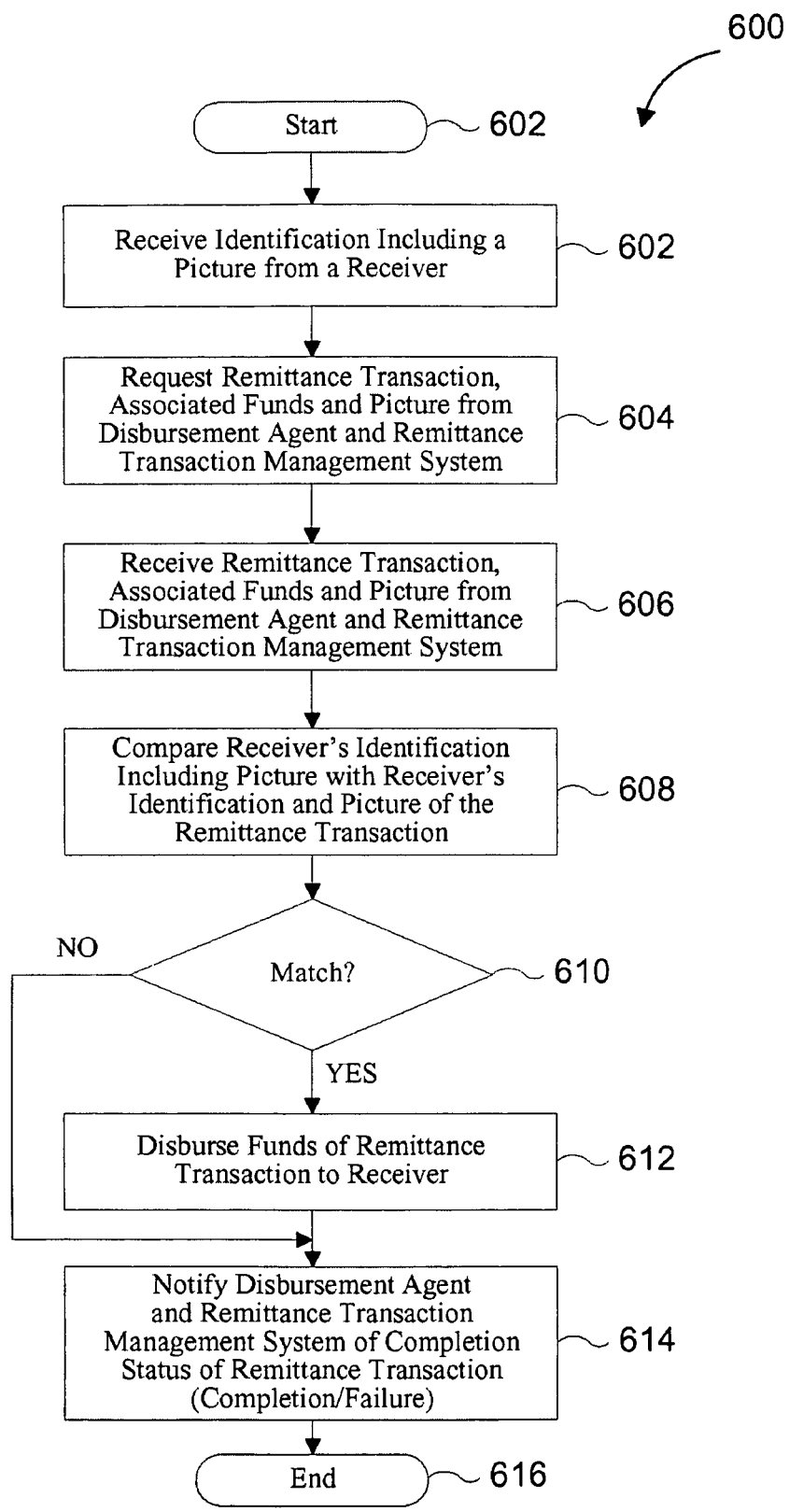
FIG. 6 is flowchart that illustrates an example method performed by the disbursement agent for a remittance transaction using secondary identification of picture transmission in accordance with FIGS. 1-5.

FIG. 6 is flowchart that illustrates an example method 600 performed by the disbursement agent 128 for a remittance transaction using secondary identification of picture transmission in accordance with FIGS. 1-5. The example method 600 starts at operation 602. It is assumed that receiver 130 visits the disbursement agent 128, presents identification and asks for disbursement of funds in connection with notification of the remittance transaction that the receiver 130 has received from the remittance management system 108 (FIG. 4, operation 416). At operation 604, the disbursement agent 128 receives the identification that includes a picture from the receiver 130. At operation 606, the disbursement agent 128 requests the remittance transaction and the associated funds and picture from the disbursement agent and remittance transaction management system 122. At operation 608, the disbursement agent 128 receives the requested remittance transaction and the associated funds and picture from the disbursement agent and remittance transaction management system 122. At operation 610, the disbursement agent 128 compares the receiver and/or receiver's identification that includes the picture with the receiver's information (e.g., name, address, etc.) and picture of the remittance transaction. If a match of identification and picture are determined at operation 610, the method 600 continues at operation 612 where the disbursement agent 128 disburses the funds associated with the remittance transaction to the receiver 130. If it is determined that there is no match of identification and picture at operation 610, the method 600 continues at operation 614. At operation 614, the disbursement agent notifies the disbursement agent and remittance transaction management system 122 of a completion status of the remittance transaction (e.g., completion or failure). The method 600 ends at operation 616.

Figure 7:
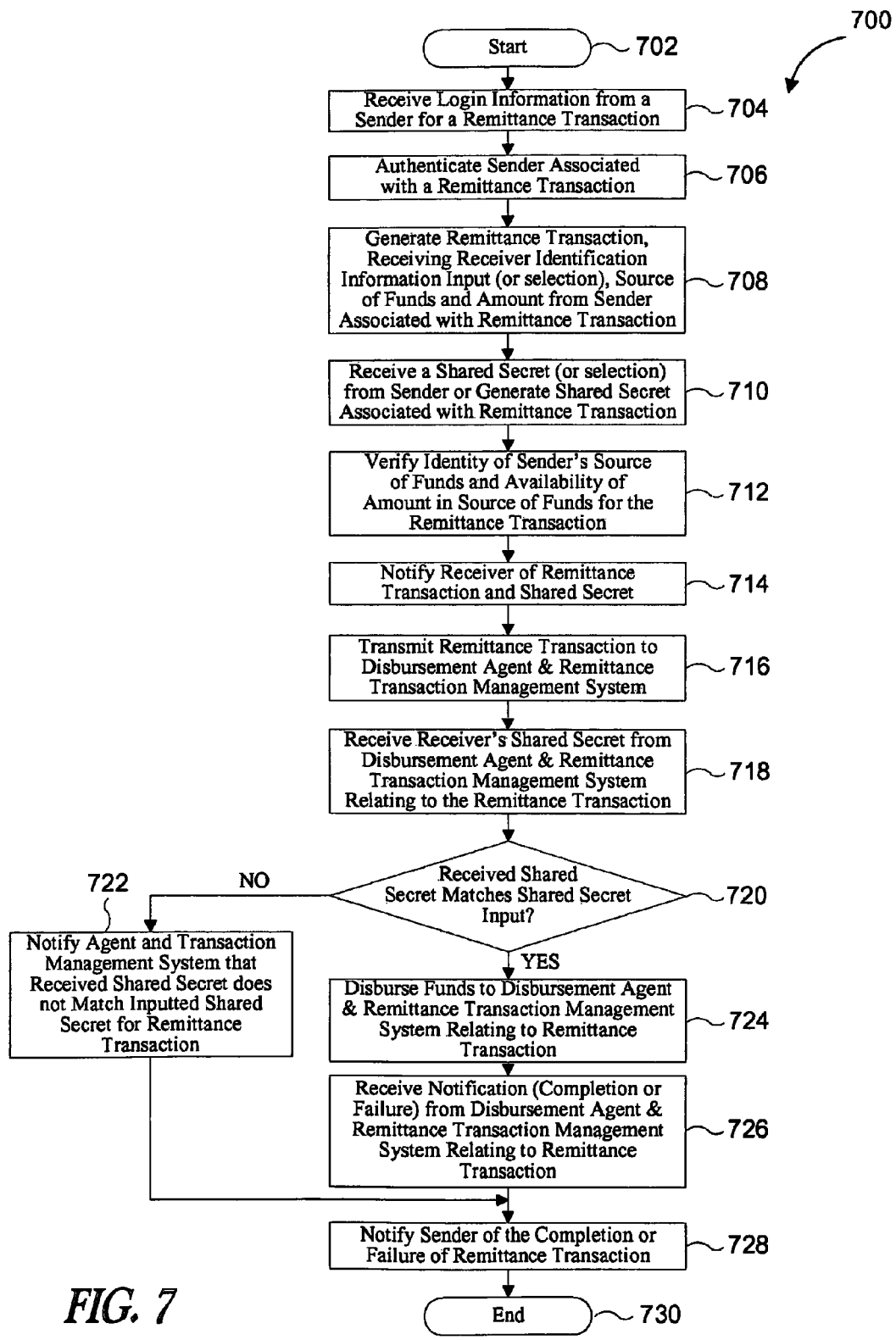
FIG. 7 is flowchart that illustrates an example method performed by the remittance management system for a remittance transaction using secondary identification of shared secret transmission in accordance with FIGS. 1-3.

FIG. 7 is flowchart that illustrates an example method 700 performed by the remittance management system 108 for a remittance transaction using secondary identification of shared secret transmission in accordance with FIGS. 1-3. The method 700 starts at operation 702. At operation 704, the sender authentication module 216 receives login or authentication information from the sender 102 via sending device 104 for a remittance transaction. As described above authentication information may include a combination of username, password, and/or a PIN entered by the sender 130 via sending device 104, or the authentication information may also be (or may additionally include) information associated with the sender's 102 sending device 104, such as device specific identification and password. At operation 706, the sender authentication module 216 authenticates the sender 102 using the foregoing login or authentication information for the remittance transaction. At operation 708, the remittance transaction module 212 generates a remittance transaction, receiving identification of receiver 130 or a pre-stored selection for receiver 130, a source of funds (e.g., user remittance account 244, sender bank account 116 that may be a bank account, or a credit card account, or the like) and an amount to be deducted or obtained from the source of funds associated with the remittance transaction.

Further with reference to FIG. 7, at operation 710 the shared secret module 224 may also receive from the sender 102 a shared secret between the sender 102 and the receiver 130 (SRSS) or may generate a shared secret between the remittance management system 108 and the receiver 130 (RRSS) for secondary identification of the receiver 130. Thereafter, at operation 712, the funds source and availability module 220 verifies the identity of the sender's inputted source of funds and the availability of inputted amount in the source of funds for the remittance transaction. At operation 714, the remittance notification module 214 notifies the receiver 130 of the remittance transaction and the received shared secret. As described previously, the notification may be delivered by conventional telephone or cellular telephone call, SMS or other text/media messaging service, email, internet based secure message board, or the like. The notification may also be delivered by conventional mail. The sender 102 may also be notified of the pending remittance transaction if desired. At operation 716, the remittance transaction routing module 234 transmits the generated remittance transaction to the disbursement agent and remittance transaction management system 122. At operation 718, the shared secret module 222 receives the receiver's 130 shared secret from the disbursement agent and remittance transaction management system 122 relating to the remittance transaction (e.g., receiver's 130 shared secret received by and forwarded to system 122 by disbursement agent 128).

Still further with reference to FIG. 7, at operation 720 the shared secret module 224 determines whether the shared secret received from disbursement agent and remittance transaction management system 122 matches the shared secret inputted by the sender 102 (SRSS) or generated by the remittance management system 108 (RRSS). Therefore, if shared secrets do not match at operation 720, the method 700 continues at operation 722 at which the shared secret module 224 notifies the disbursement agent and remittance transaction management system 122 that shared secrets (SRSS or RRSS) do not match for the remittance transaction, and the method 700 continues at operation 728. Alternatively, if the shared secrets do match at operation 720, the method continues at operation 724 where the funds routing module 236 disburses funds associated with the remittance transaction to the disbursement agent and remittance transaction management system 122. In an alternate embodiment, the shared secret module 224 may transmit the shared secret to the disbursement agent via the disbursement agent and remittance transaction management system 122 to allow the disbursement agent to make the decision if the shared secret matches the secret provided by recipient 130. In such a case, upon notification of a match via 128, 122, at operation 724 the funds routing module 236 may disburse funds associated with the remittance transaction to the disbursement agent and remittance transaction management system 122. At operation 726, the notification routing module 241 receives notification (completion or failure status) from the disbursement agent and remittance transaction system 122 relating to the remittance transaction, routing the notification to the competition notification module 221. At operation 728, the competition notification module 221 notifies the sender 102 via sending device 104 of the completion status (completion or failure) of the remittance transaction. The example method 700 ends at operation 730.

Figure 8:
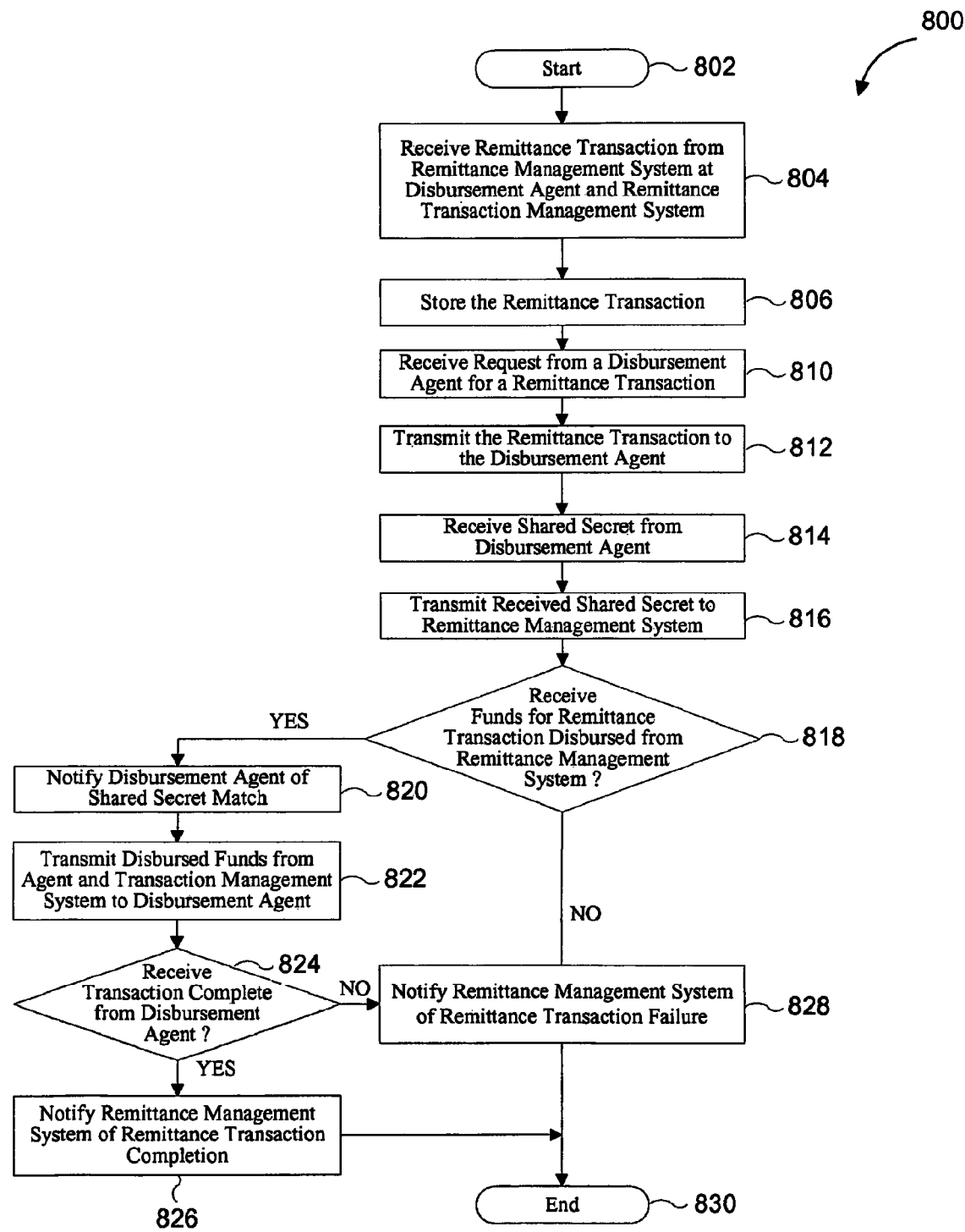
FIG. 8 is flowchart that illustrates an example method performed by the disbursement agent and remittance transaction system for a remittance transaction using secondary identification of shared secret transmission in accordance with FIGS. 1-3 and 7.

FIG. 8 is flowchart that illustrates an example method 800 performed by the disbursement agent and remittance transaction system 122 for a remittance transaction using secondary identification of shared secret transmission in accordance with FIGS. 1-3 and 7. The method 800 starts at operation 802. At operation 804, the remittance transaction receiver module 308 receives a remittance transaction from the remittance management system 108. The received remittance transaction is stored in the remittance transaction database 318 for the remittance transaction at operation 806. At operation 810, a request is received from a disbursement agent (e.g., disbursement agent 128) for the remittance transaction by the disbursement agent request/response module 310. As described hereinabove, the request is made at a time when the receiver 130 visits the disbursement agent 128 and requests funds to be disbursed. At operation 812, the disbursement agent request/response module 310 transmits the stored remittance transaction to the disbursement agent 128. At operation 814, the identification module 314 receives a shared secret (SSRS or RRSS) from the disbursement agent 128 (e.g., the shared secret provided by the receiver 130 to the disbursement agent 128). At operation 816, the identification module 314 transmits the received shared secret to the remittance management system 108.

Further with reference to FIG. 8, at operation 818 the funds disbursement module 312 determines whether funds for the remittance transaction have been received from the remittance management system 108. If it is determined that funds have been received at operation 818, then at operation 820 the funds disbursement module 312 notifies the disbursement agent 128 of the shared secret match (SSRS or RRSS). At operation, 822 the funds disbursement module 312 disburses the funds to the disbursement agent 128. At operation 824, the remittance transaction completion status module 316 determines whether the remittance transaction complete status is received from the disbursement agent 128. If remittance transaction is complete, at operation 826, the remittance transaction completion status module 316 notifies the remittance management system 108 of the complete status for the remittance transaction. If remittance transaction is not complete (failed), at operation 828, the remittance transaction completion status module 316 notifies the remittance management system 108 of the fail status for the remittance transaction. Now returning back to operation 818, if it is determined that funds have not been received at operation 818, then the method 800 continues at operation 828 where the remittance transaction completion status module 316 notifies the remittance management system 108 of the fail status for the remittance transaction. The method 800 ends at operation 830.

Figure 9:
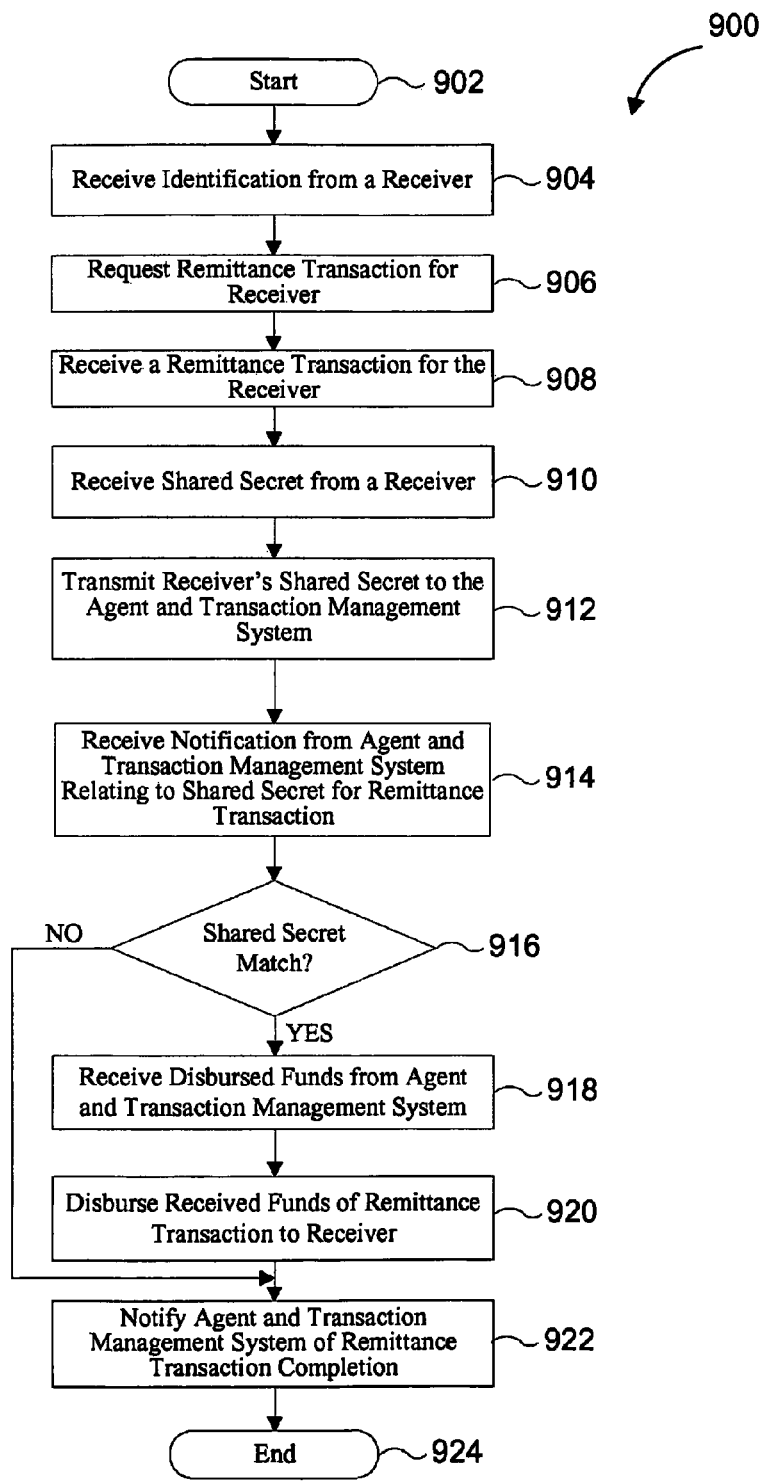
FIG. 9 is flowchart that illustrates an example method performed by the disbursement agent for a remittance transaction using secondary identification of shared secret in accordance with FIGS. 1-3, 7 and 8.

FIG. 9 is flowchart that illustrates an example method 900 performed by the disbursement agent 128 for a remittance transaction using secondary identification of shared secret in accordance with FIGS. 1-3, 7 and 8. The method 900 starts at operation 902. At operation 904, the disbursement agent 128 receives receiver's identification from the receiver 130. At operation 906, the disbursement agent 128 requests the remittance transaction from the disbursement agent and remittance transaction management system 122. At operation 908, the disbursement agent 128 receives the requested remittance transaction from the disbursement agent and remittance transaction management system 122. At operation 910, the disbursement agent 128 receives a shared secret from the receiver 130 for the remittance transaction and at operation 912 transmits the received shared secret to the disbursement agent and remittance transaction management system 122. Thereafter, at operation 914, the disbursement agent receives a notification relating to the shared secret from the disbursement agent and remittance transaction management system 122.

Further with reference to FIG. 9, at operation 916 the disbursement agent 128 determines whether the notification indicates that there has been a match of the shared secret. Therefore, if there is no shared secret match at operation 916, the method 900 continues at operation 922 at which the disbursement agent 128 notifies the disbursement agent and remittance transaction management system 122 of remittance transaction status (e.g., failure). If however there is a shared secret match at operation 916, the method 900 continues at operation 918 at which the disbursement agent 128 receives disbursed funds for the remittance transaction from the disbursement agent and remittance transaction management system 122. At operation 920, the disbursement agent 128 disburses the funds associated with the remittance transaction to the receiver 130. Thereafter, at operation 922, the disbursement agent notifies 128 the disbursement agent and remittance transaction management system 122 of a completion status of the remittance transaction (e.g., completion). The method 900 ends at operation 924.

Figure 10:
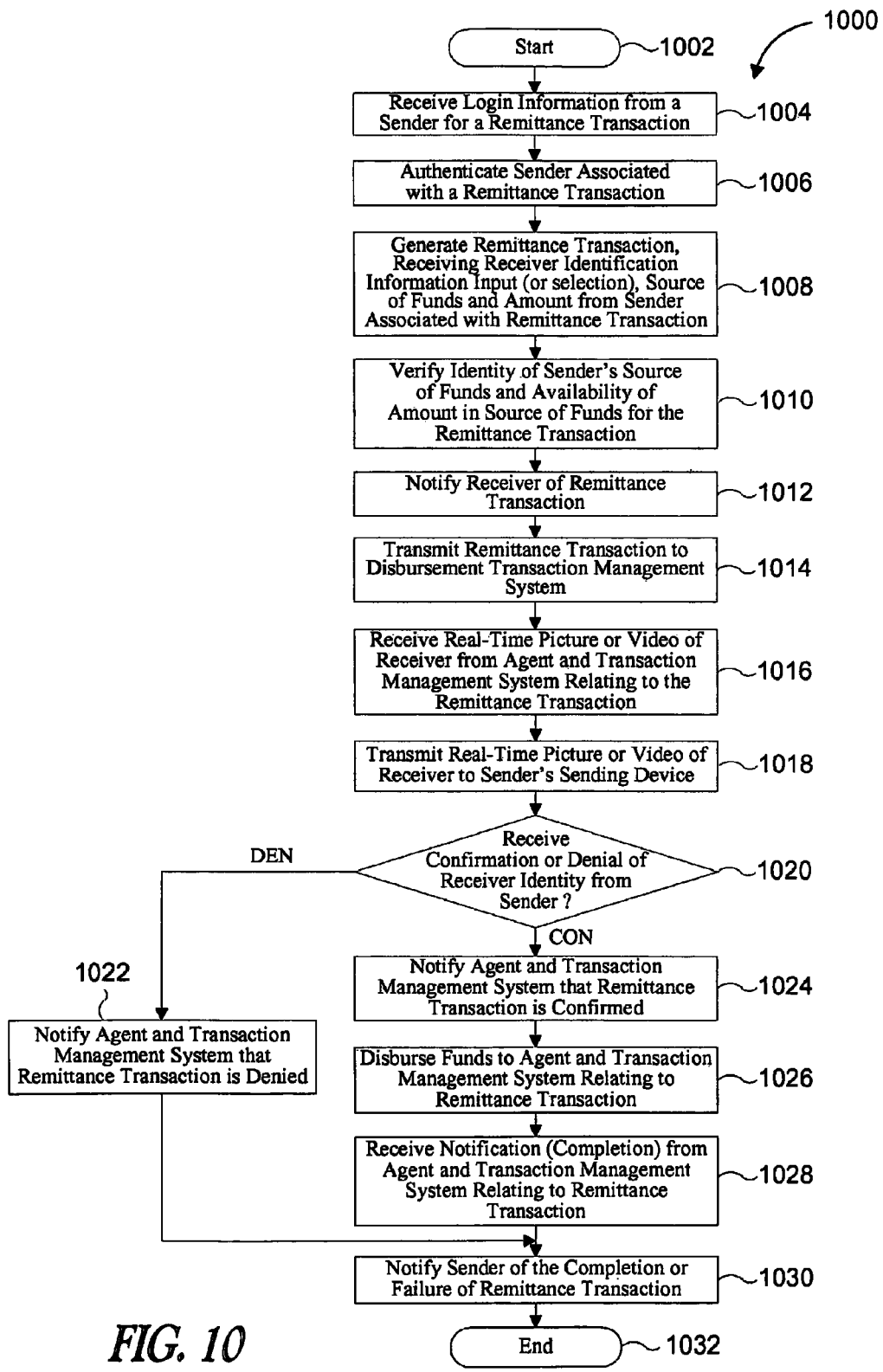
FIG. 10 is flowchart that illustrates an example method performed by the remittance management system for a remittance transaction using secondary identification of real-time picture or video transmission in accordance with FIGS. 1-3.

FIG. 10 is flowchart that illustrates an example method 1000 performed by the remittance management system 108 for a remittance transaction using secondary identification of real-time picture or video transmission in accordance with FIGS. 1-3. The method starts at operation 1002. At operation 1004, the sender authentication module 216 receives login or authentication information from the sender 102 via sending device 104 for a remittance transaction. As described above authentication information may include a combination of username, password, and a PIN entered by the sender 130 via sending device 104, or the authentication information may also be (or may additionally include) information associated with the sender's 102 sending device 104, such as device specific identification and password. At operation 1006, the sender authentication module 216 authenticates the sender 102 using the foregoing login or authentication information for the remittance transaction. At operation 1008, the remittance transaction module 212 generates a remittance transaction, receiving identification of receiver 130 or a pre-stored selection for receiver 130, a source of funds (e.g., user remittance account 244, sender bank account 116 that may be a bank account, or a credit card account, or the like) and an amount to be deducted or obtained from the source of funds associated with the remittance transaction.

Further with reference to FIG. 10, at operation 1010 the funds source and availability module 220 verifies the identity of the sender's inputted source of funds and the availability of inputted amount in the source of funds for the remittance transaction. At operation 1012, the remittance notification module 214 notifies the receiver 130 of the remittance transaction. At operation 1014, the remittance transaction routing module 234 transmits the generated remittance transaction to the disbursement agent and remittance transaction management system 122. At operation 1016, the real-time picture or video module 226 receives real-time picture or video of the receiver 130 from the disbursement agent and remittance transaction management system 122 relating to the remittance transaction. At operation 1018, the real-time picture or video module 226 transmits the received real-time picture or video of the receiver 130 to the sender 102 via sending device 104. It should be note that sending device 104 at operation 1018 may be different from the sending device in operation 1004, e.g., remittance transaction could be initiated via a website but real-time picture or video confirmation may be performed via cell phone, for example. Thereafter, at operation 1020 the real-time picture or video module 226 determines whether confirmation or denial of the real-time picture or video of the receiver 130 is received from the sender 102.

Yet further with reference to FIG. 10, if it is determined that the sender 102 has denied secondary identification of the receiver 130, then at operation 1022 the notification routing module 241 notifies the disbursement agent and remittance transaction management system 122 that the remittance transaction has been denied, and at operation 1030 the completion notification module 221 notifies the sender 102 via sending device 104 of the failure of the remittance transaction. Alternatively, if it is determined that the sender 102 has confirmed secondary identification of the receiver 130, then at operation 1024 the notification routing module 241 notifies the disbursement agent and remittance transaction management system 122 that the remittance transaction is confirmed. Thereafter, at operation 1026, the funds routing module 236 disburses the funds to the disbursement agent and remittance transaction management system 122 for the remittance transaction. At operation 1028, the notification routing module 241 receives completion notification of the remittance transaction from the disbursement agent and remittance transaction management system 122. At operation 1030, the completion notification module 221 notifies the sender 102 via sending device 104 of completion of the remittance transaction. The method 1000 ends at operation 1032.

Figure 11:
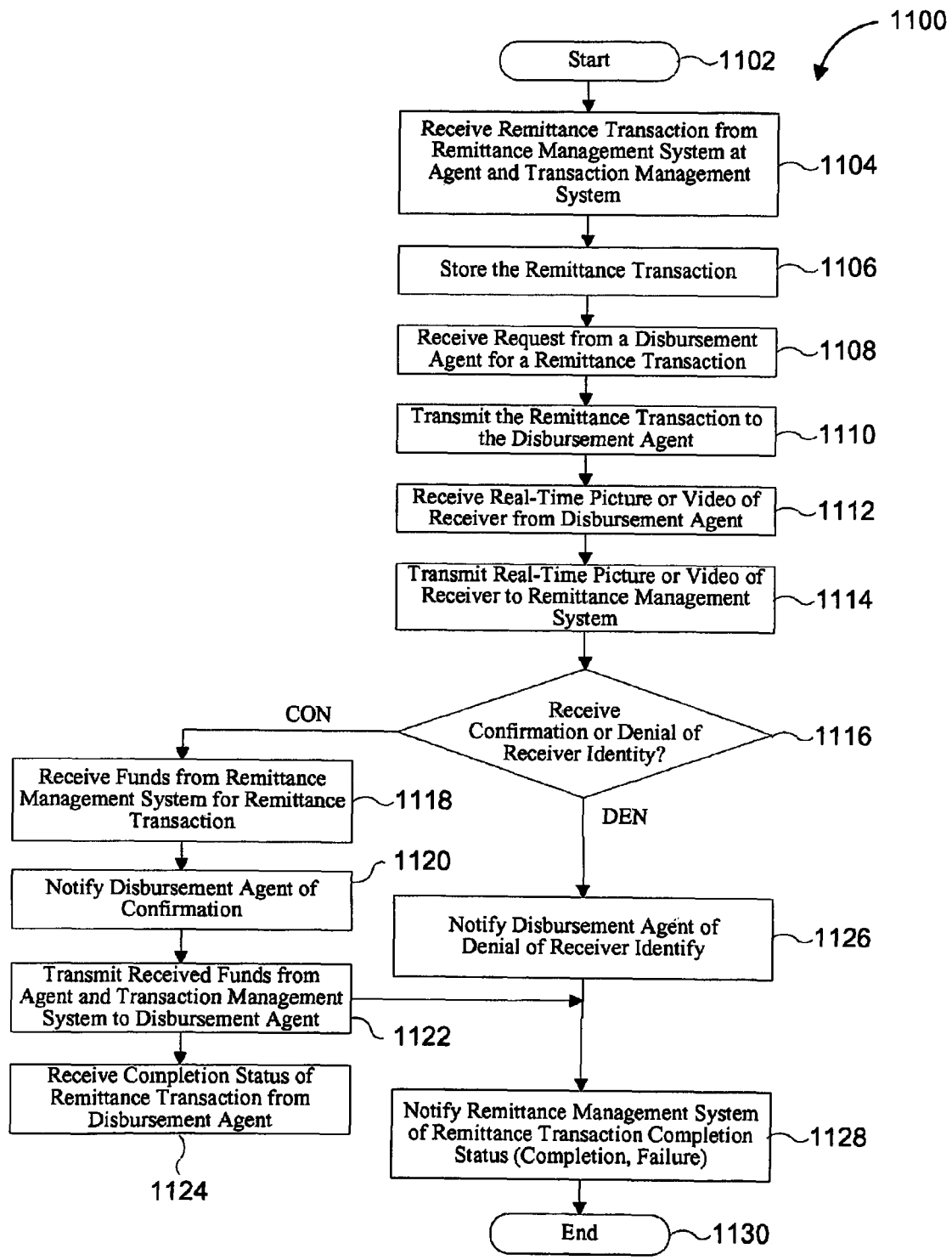
FIG. 11 is flowchart that illustrates an example method performed by the disbursement agent and remittance transaction system for a remittance transaction using secondary identification of real-time picture or video transmission in accordance with FIGS. 1-3 and 10.

FIG. 11 is flowchart that illustrates an example method 1100 performed by the disbursement agent and remittance transaction system 122 for a remittance transaction using secondary identification of real-time picture or video transmission in accordance with FIGS. 1-3 and 10. The method 1100 starts at operation 1102. At operation 1104, the remittance transaction receiver module 308 receives a remittance transaction from the remittance management system 108. The received remittance transaction is stored in the remittance transaction database 318 for the remittance transaction at operation 1106. At operation 1108, a request is received from a disbursement agent (e.g., disbursement agent 128) for the remittance transaction by the disbursement agent request/response module 310. As described hereinabove, the request is made at a time when the receiver 130 visits the disbursement agent 128 and requests funds to be disbursed. At operation 1110, the disbursement agent request/response module 310 transmits the stored remittance transaction to the disbursement agent 128. At operation 1112, the identification module 314 receives a real-time picture or video of receiver 130 from the disbursement agent 128. At operation 1114, the identification module 314 transmits the received real-time picture or video of the receiver 130 to the remittance management system 108.

Further with reference to FIG. 11, at operation 1116 the funds disbursement module 312 determines whether confirmation or denial of secondary identification has been received from the remittance management system 108 (e.g., via sender 102 using sending device 104). If it is determined that confirmation has been received, at operation 1118 funds are received from the remittance management system 108 for the remittance transaction. Thereafter, at operation 1120 the identification module 314 notifies the disbursement agent 128 of the confirmation. At operation, 1122 the funds disbursement module 312 disburses the funds to the disbursement agent 128. At operation 1124, the remittance transaction completion status module 316 receives completion status of the remittance transaction form the disbursement agent 128 and at operation 1128, the remittance transaction completion status module 316 notifies the remittance management system 108 of the remittance transaction completion status (e.g., completion). Now referring back to operation 1116, if the funds disbursement module 312 determines that denial of secondary identification has been received from the remittance management system 108, then at operation 1126 the identification module 314 notifies the disbursement agent 128 of the denial of secondary identification of receiver 130. At operation 1128, the remittance transaction completion status module 316 notifies the remittance management system 108 of the remittance transaction completion status (e.g., failure). The method 1100 ends at operation 1130.

Figure 12:
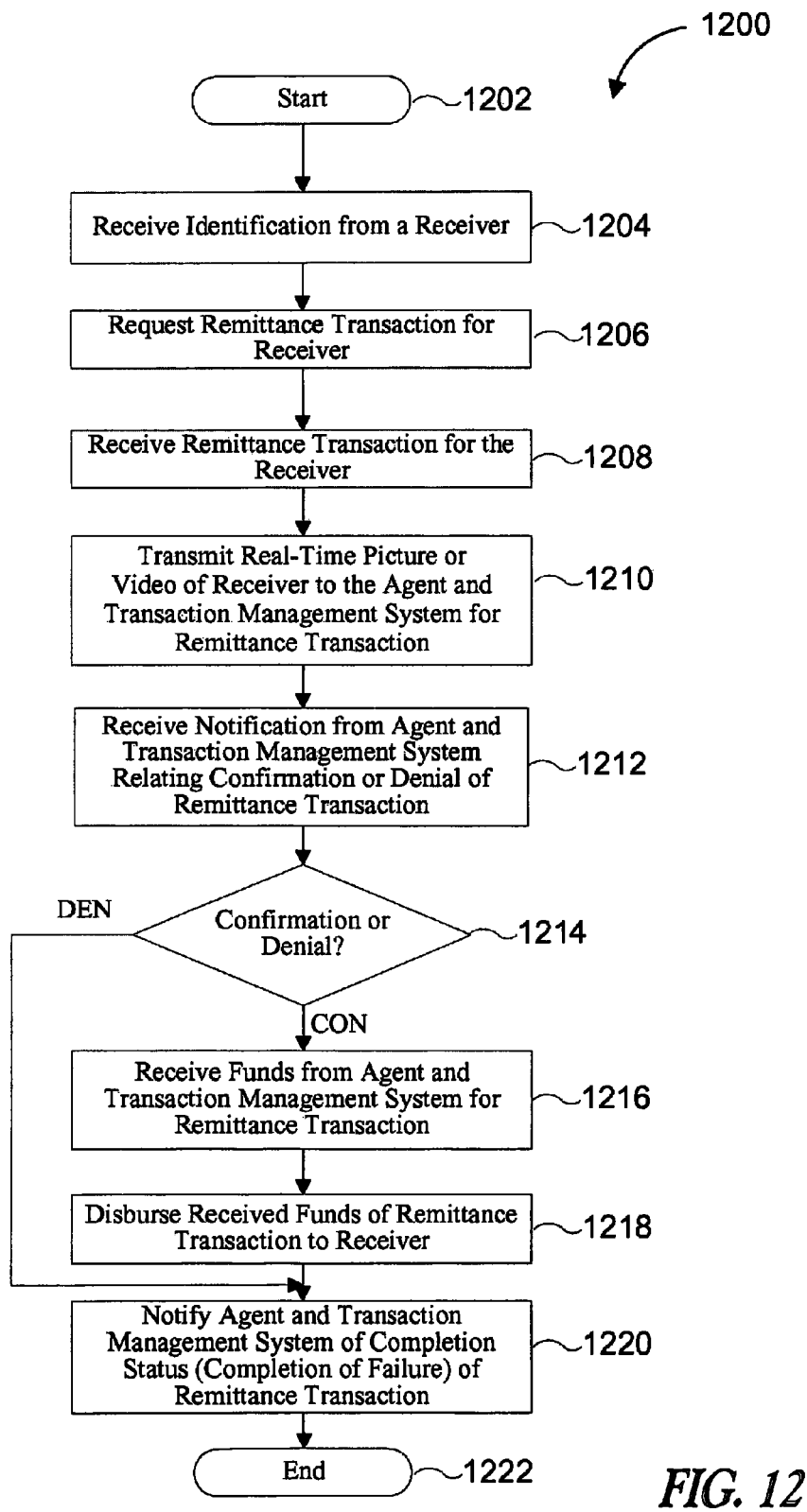
FIG. 12 is flowchart that illustrates an example method performed by the disbursement agent for a remittance transaction using secondary identification of real-time picture or video transmission in accordance with FIGS. 1-3, 10 and 11.

FIG. 12 is flowchart that illustrates an example method 1200 performed by the disbursement agent 128 for a remittance transaction using secondary identification of real-time picture or video transmission in accordance with FIGS. 1-3, 10 and 11. The method 1200 starts at operation 1202. At operation 1204, the disbursement agent 128 receives receiver's identification from the receiver 130. At operation 1206, the disbursement agent 128 requests the remittance transaction for the receiver 130 from the disbursement agent and remittance transaction management system 122. At operation 1208, the disbursement agent 128 receives the requested remittance transaction from the disbursement agent and remittance transaction management system 122. At operation 1210, the disbursement agent 128 transmits a real-time picture or video of receiver 130 to the disbursement agent and remittance transaction management system 122. Thereafter, at operation 1212, the disbursement agent 128 receives a notification relating to the confirmation or denial of secondary identification for remittance transaction from the disbursement agent and remittance transaction management system 122.

Further with reference to FIG. 12, at operation 1214 the disbursement agent 128 determines whether the notification indicates that there has been a confirmation or denial of secondary identification of the receiver 130. Therefore, if the notification is determined to be a denial at operation 1214, the method 1200 continues at operation 1120 at which the disbursement agent 128 notifies the disbursement agent and remittance transaction management system 122 of remittance transaction status (e.g., failure). If however the notification is determined to be a confirmation at operation 1214, the method 1200 continues at operation 1216 at which the disbursement agent 128 receives disbursed funds for the remittance transaction from the disbursement agent and remittance transaction management system 122. At operation 1218, the disbursement agent 128 disburses the funds associated with the remittance transaction to the receiver 130. Thereafter, at operation 1220, the disbursement agent notifies 128 the disbursement agent and remittance transaction management system 122 of a completion status of the remittance transaction (e.g., completion). The method 1200 ends at operation 1222.

Figure 13:
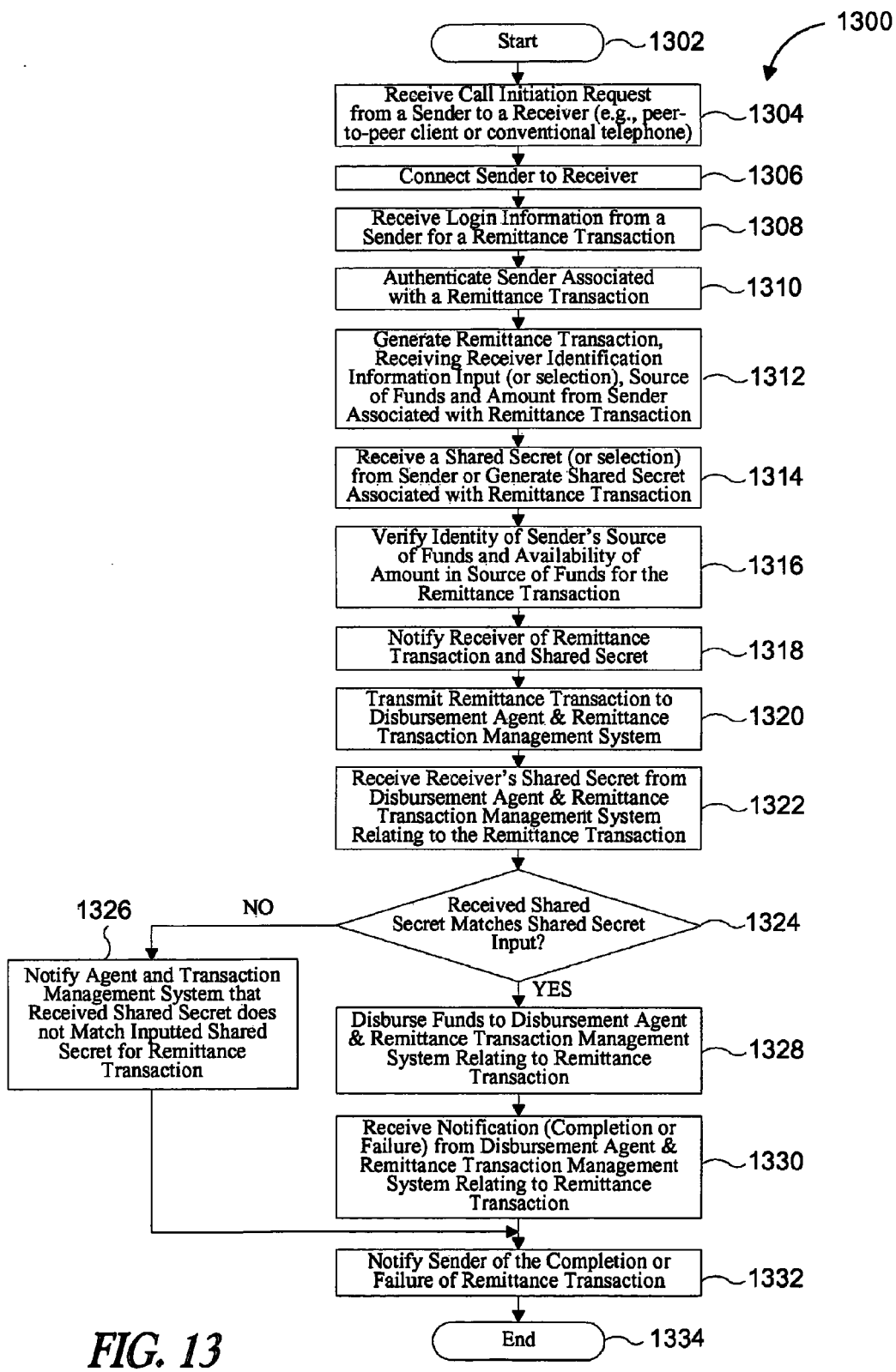
FIG. 13 is flowchart that illustrates an example method performed by the remittance management system for a remittance on call transaction using secondary identification of shared secret transmission in accordance with FIGS. 1-3.

FIG. 13 is flowchart that illustrates an example method 1300 performed by the remittance management system 108 for a remittance on call transaction using secondary identification of shared secret transmission in accordance with FIGS. 1-3. The method 1300 start at operation 1302. At operation 1304, the communication subsystem 202 (e.g., via interactive response module 204 or sender network module 206) receives a call initiation request from sender 102 to receiver 130 (e.g., sending device 104 to receiving device 112). At operation 1306, the communication subsystem 202 (e.g., via receiver communication module 208) connects the sender 102 (via sending device 104) to the receiver 130 (via receiving device 112). At operation 1308, the sender authentication module 216 receives login or authentication information from the sender 102 via sending device 104 for a remittance transaction. As described above authentication information may include a combination of username, password, and a PIN entered by the sender 130 via sending device 104, or the authentication information may also be (or may additionally include) information associated with the sender's 102 sending device 104, such as device specific identification and password. The remittance on call transaction may be initiated in several ways. For example, if the call is from a software client (e.g., Skype), the remittance on call could be initiated via a "button" or other form of interactive initiation in the software client. The remittance transaction, including input of login information, shared secret information and notifications may be completed via web forms or software interfaces within software client (e.g., Skype). If, however, the call is from a land line, a cellular, or other voice based telephone or service, the remittance on call may be initiated via a keystroke combination (e.g., "*77") on the keypad and the remittance transaction may be completed via the interactive response module (IRM) 204 of communication subsystem 202.

Further with reference to FIG. 13, at operation 1310 the sender authentication module 216 authenticates the sender 102 using the foregoing login or authentication information for the remittance transaction. At operation 1312, the remittance transaction module 212 generates a remittance transaction, receiving identification of receiver 130 or a pre-stored selection for receiver 130, a source of funds (e.g., user remittance account 244, sender bank account 116 that may be a bank account, or a credit card account, or the like) and an amount to be deducted or obtained from the source of funds associated with the remittance transaction. At operation 1314 the shared secret module 224 may also receive from the sender 102 a shared secret between the sender 102 and the receiver 130 (SRSS) or may generate a shared secret between the remittance management system 108 and the receiver 130 (RRSS) for secondary identification of the receiver 130. Thereafter, at operation 1316, the funds source and availability module 220 verifies the identity of the sender's inputted source of funds and the availability of inputted amount in the source of funds for the remittance transaction. At operation 1318, the remittance notification module 214 notifies the receiver 130 of the remittance transaction and the received shared secret. The notification may be delivered via the connection method via which the sender 102 is connected to the receiver 130 (e.g., software client or telephone) or via alternate means of communication such as a conventional telephone or cellular telephone call, SMS or other text/media messaging service, email, internet based secure message board, or the like. The sender 102 may also be notified of the pending remittance transaction if desired via the current connection method. At operation 1320, the remittance transaction routing module 234 transmits the generated remittance transaction to the disbursement agent and remittance transaction management system 122. At operation 1322, the shared secret module 222 receives the receiver's 130 shared secret from the disbursement agent and remittance transaction management system 122 relating to the remittance transaction (e.g., receiver's 130 shared secret received by and forwarded to system 122 by disbursement agent 128).

Still further with reference to FIG. 13, at operation 1324 the shared secret module 224 determines whether the shared secret received from disbursement agent and remittance transaction management system 122 matches the shared secret inputted by the sender 102 (SRSS) or generated by the remittance management system 108 (RRSS). Therefore, if shared secrets do not match at operation 1324, the method 1300 continues at operation 1326 at which the shared secret module 224 notifies the disbursement agent and remittance transaction management system 122 that shared secrets (SRSS or RRSS) do not match for the remittance transaction, and the method 1300 continues at operation 1332. Alternatively, if the shared secrets do match at operation 1324, the method continues at operation 1328 where the funds routing module 236 disburses funds associated with the remittance transaction to the disbursement agent and remittance transaction management system 122. At operation 1330, the notification routing module 241 receives notification (completion or failure status) from the disbursement agent and remittance transaction system 122 relating to the remittance transaction, routing the notification to the competition notification module 221. At operation 1332, the competition notification module 221 notifies the sender 102 via sending device 104 of the completion status (completion or failure) of the remittance transaction. As before the notification may be effected using the same communication method via which the sender 102 is communicating to the receiver 130, or an alternate means of communication. The example method 1334 ends at operation 1334.

Figure 14:
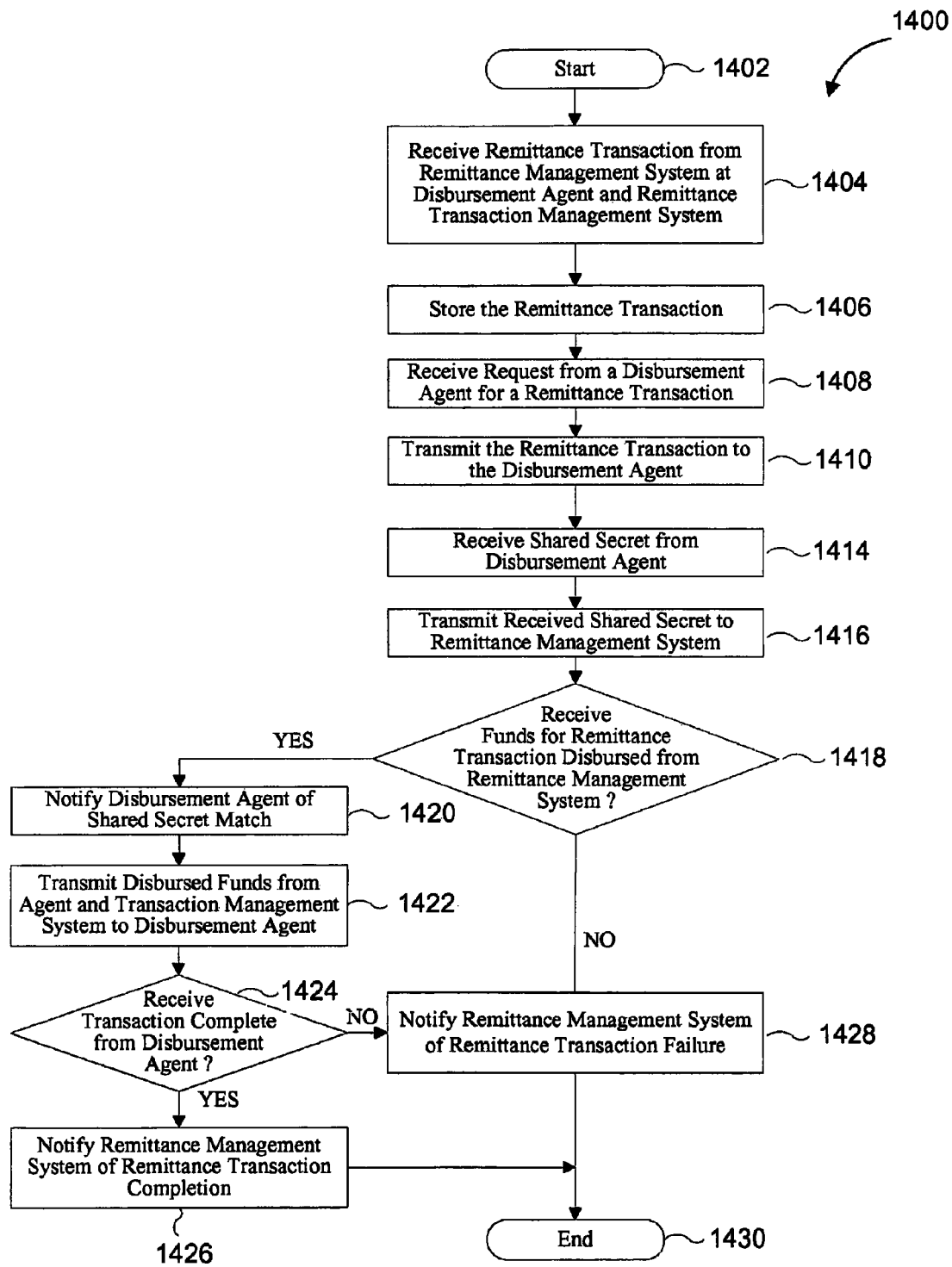
FIG. 14 is flowchart that illustrates an example method performed by the disbursement agent and remittance transaction system for a remittance on call transaction using secondary identification of shared secret transmission in accordance with FIGS. 1-3 and 13.

FIG. 14 is flowchart that illustrates an example method 1400 performed by the disbursement agent and remittance transaction system 122 for a remittance on call transaction using secondary identification of shared secret transmission in accordance with FIGS. 1-3 and 13. The method 1400 starts at operation 1402. At operation 1404, the remittance transaction receiver module 308 receives a remittance transaction from the remittance management system 108. The received remittance transaction is stored in the remittance transaction database 318 for the remittance transaction at operation 1406. At operation 1408, a request is received from a disbursement agent (e.g., disbursement agent 128) for the remittance transaction by the disbursement agent request/response module 310. As described hereinabove, the request is made at a time when the receiver 130 visits the disbursement agent 128 and requests funds to be disbursed. At operation 1410, the disbursement agent request/response module 310 transmits the stored remittance transaction to the disbursement agent 128. At operation 1414, the identification module 314 receives a shared secret (SSRS or RRSS) from the disbursement agent 128 (e.g., the shared secret provided by the receiver 130 to the disbursement agent 128). At operation 1416, the identification module 314 transmits the received shared secret to the remittance management system 108.

Further with reference to FIG. 14, at operation 1418 the funds disbursement module 312 determines whether funds for the remittance transaction have been received from the remittance management system 108. If it is determined that funds have been received at operation 1418, then at operation 1420 the funds disbursement module 312 notifies the disbursement agent 128 of the shared secret match (SSRS or RRSS). At operation, 1422 the funds disbursement module 312 disburses the funds to the disbursement agent 128. At operation 1424, the remittance transaction completion status module 316 determines whether the remittance transaction complete status is received from the disbursement agent 128. If remittance transaction is complete, at operation 1426, the remittance transaction completion status module 316 notifies the remittance management system 108 of the complete status for the remittance transaction. If remittance transaction is not complete (failed), at operation 1428, the remittance transaction completion status module 316 notifies the remittance management system 108 of the fail status for the remittance transaction. Now returning back to operation 1418, if it is determined that funds have not been received at operation 1418, then the method 1400 continues at operation 1428 where the remittance transaction completion status module 316 notifies the remittance management system 108 of the fail status for the remittance transaction. The method 1400 ends at operation 1430.

Figure 15:
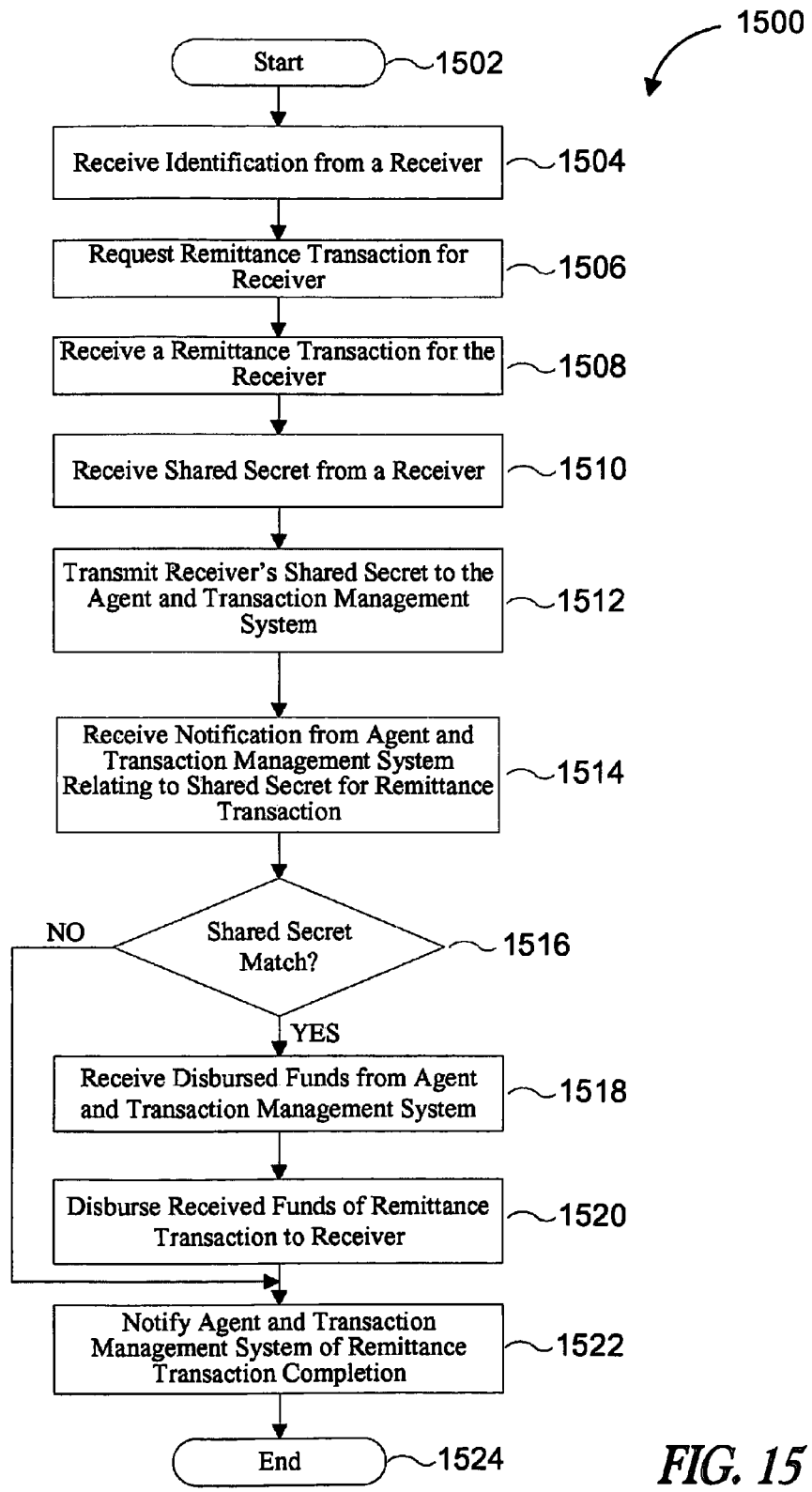
FIG. 15 is flowchart that illustrates an example method performed by the disbursement agent for a remittance transaction using secondary identification of shared secret in accordance with FIGS. 1-3, 13 and 14.

FIG. 15 is flowchart that illustrates an example method 1500 performed by the disbursement agent 128 for a remittance on call transaction using secondary identification of shared secret transmission in accordance with FIGS. 1-3, 13 and 14. The method 1500 starts at operation 1502. At operation 1504, the disbursement agent 128 receives receiver's identification from the receiver 130. At operation 1506, the disbursement agent 128 requests the remittance transaction from the disbursement agent and remittance transaction management system 122. At operation 1508, the disbursement agent 128 receives the requested remittance transaction from the disbursement agent and remittance transaction management system 122. At operation 1510, the disbursement agent 128 receives a shared secret from the receiver 130 for the remittance transaction and at operation 1512 transmits the received shared secret to the disbursement agent and remittance transaction management system 122. Thereafter, at operation 1514, the disbursement agent receives a notification relating to the shared secret from the disbursement agent and remittance transaction management system 122.

Further with reference to FIG. 15, at operation 1516 the disbursement agent 128 determines whether the notification indicates that there has been a match of the shared secret. Therefore, if there is no shared secret match at operation 1516, the method 1500 continues at operation 1522 at which the disbursement agent 128 notifies the disbursement agent and remittance transaction management system 122 of remittance transaction status (e.g., failure). If however there is a shared secret match at operation 1516, the method 1500 continues at operation 1518 at which the disbursement agent 128 receives disbursed funds for the remittance transaction from the disbursement agent and remittance transaction management system 122. At operation 1520, the disbursement agent 128 disburses the funds associated with the remittance transaction to the receiver 130. Thereafter, at operation 1522, the disbursement agent notifies 128 the disbursement agent and remittance transaction management system 122 of a completion status of the remittance transaction (e.g., completion). The method 1500 ends at operation 1524.

Figure 16:
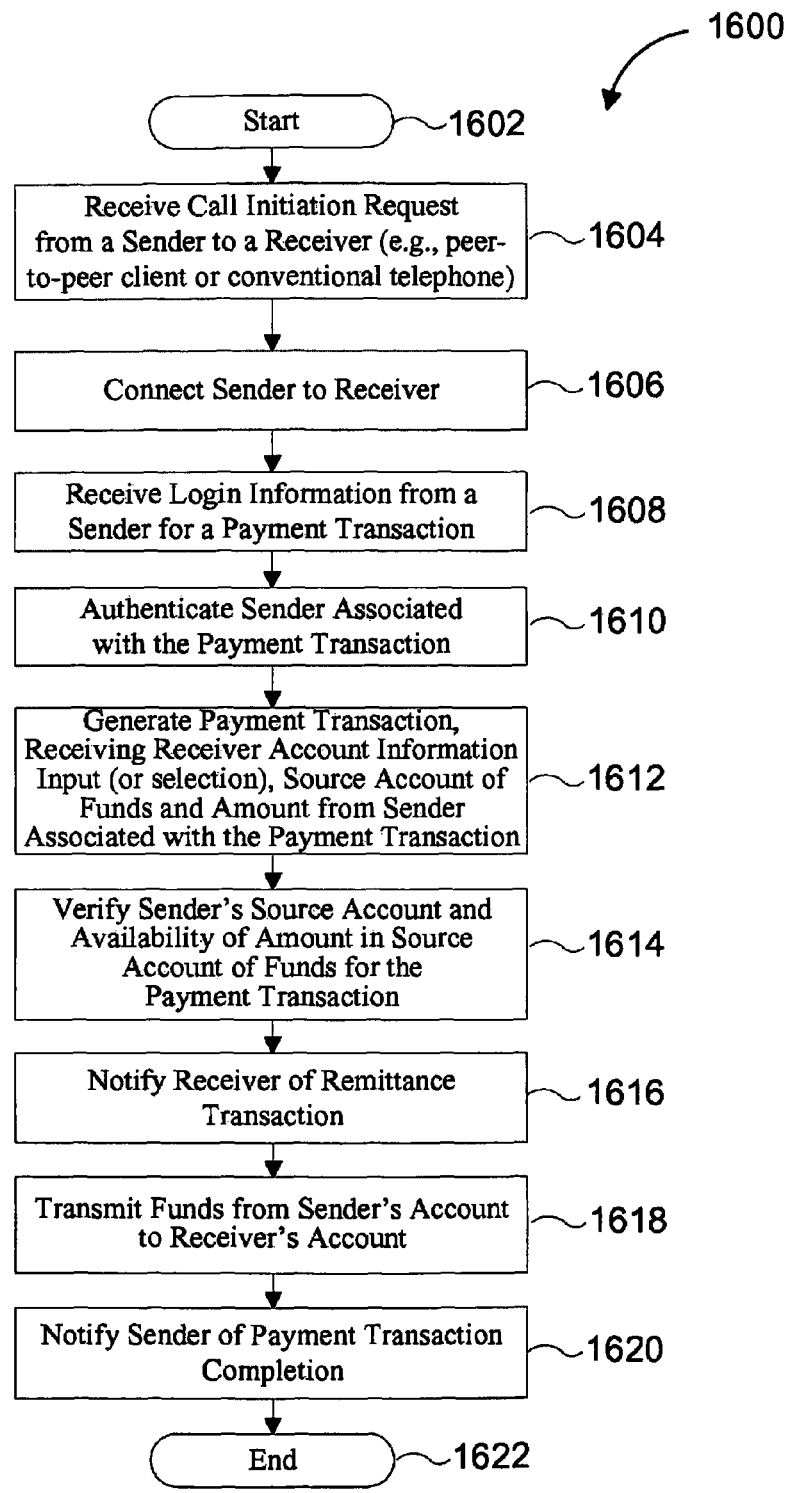
FIG. 16 is flowchart that illustrates an example method performed by the remittance management system for payment on call transaction in accordance with FIGS. 1-3.

FIG. 16 is flowchart that illustrates an example method 1600 performed by the remittance management system 108 for payment on call transaction in accordance with FIGS. 1-3. In this example method, the receiver 130 does not collect funds in accordance with a remittance transaction from a disbursement agent 128; instead a payment transaction transmits funds from a sender's remittance account to a receiver's remittance account of the remittance management system 108, as will be described below. The method 1600 start at operation 1602. At operation 1604, the communication subsystem 202 (e.g., via interactive response module 204 or sender network module 206) receives a call from sender 102 to receiver 130 (e.g., sending device 104 to receiving device 112). At operation 1606, the communication subsystem 202 (e.g., via receiver communication module 208) connects the sender 102 (via sending device 104) to the receiver 130 (via receiving device 112). At operation 1608, the sender authentication module 216 receives login or authentication information from the sender 102 via sending device 104 for a payment transaction. As described above authentication information may include a combination of username, password, and a PIN entered by the sender 130 via sending device 104, or the authentication information may also be (or may additionally include) information associated with the sender's 102 sending device 104, such as device specific identification and password. The payment on call transaction may be initiated in several ways. For example, if the call is from a software client (e.g., Skype), the payment on call could be initiated via a "button" or other form of interactive initiation in the software client. The payment transaction, including input of login information and notifications, may be completed via web forms or software interfaces within software client (e.g., Skype). If, however, the call is from a land line, a cellular, or other voice based telephone or service, the payment on call may be initiated via a keystroke combination (e.g., "*77") on the keypad and the payment transaction may be completed via the interactive response module (IRM) 204 of communication subsystem 202.

Further with reference to FIG. 16, at operation 1610 the sender authentication module 216 authenticates the sender 102 using the foregoing login or authentication information for the remittance transaction. At operation 1612, the remittance transaction module 212 generates a payment transaction, receiving identification of receiver 130 or a pre-stored selection for receiver 130, a source of funds (e.g., user remittance account 244, sender bank account 116 that may be a bank account, or a credit card account, or the like) and an amount to be deducted or obtained from the source of funds associated with the remittance transaction. Thereafter, at operation 1614, the funds source and availability module 220 verifies the identity of the sender's inputted source of funds and the availability of inputted amount in the source of funds for the remittance transaction. At operation 1616, the remittance notification module 214 notifies the receiver 130 of the remittance transaction and the received shared secret. The notification may be delivered via the connection method via which the sender 102 is connected to the receiver 130 (e.g., software client or telephone) or via alternate means of communication such as a conventional telephone or cellular telephone call, SMS or other text/media messaging service, email, internet based secure message board, or the like. The sender 102 may also be notified of the pending remittance transaction if desired via the current connection method. At operation 1618, the remittance transaction routing module 234 transmits the payment transaction to the user account subsystem 424, which transmits the funds from the sender's 102 user remittance account 244 to the receiver's 130 user remittance account 244. At operation 1620, the competition notification module 221 notifies the sender 102 via sending device 104 of the completion of the payment transaction. As before, the notification may be effected using the same communication method via which the sender 102 is communicating to the receiver 130, or an alternate means of communication. The example method 1600 ends at operation 1622.

Figure 17:
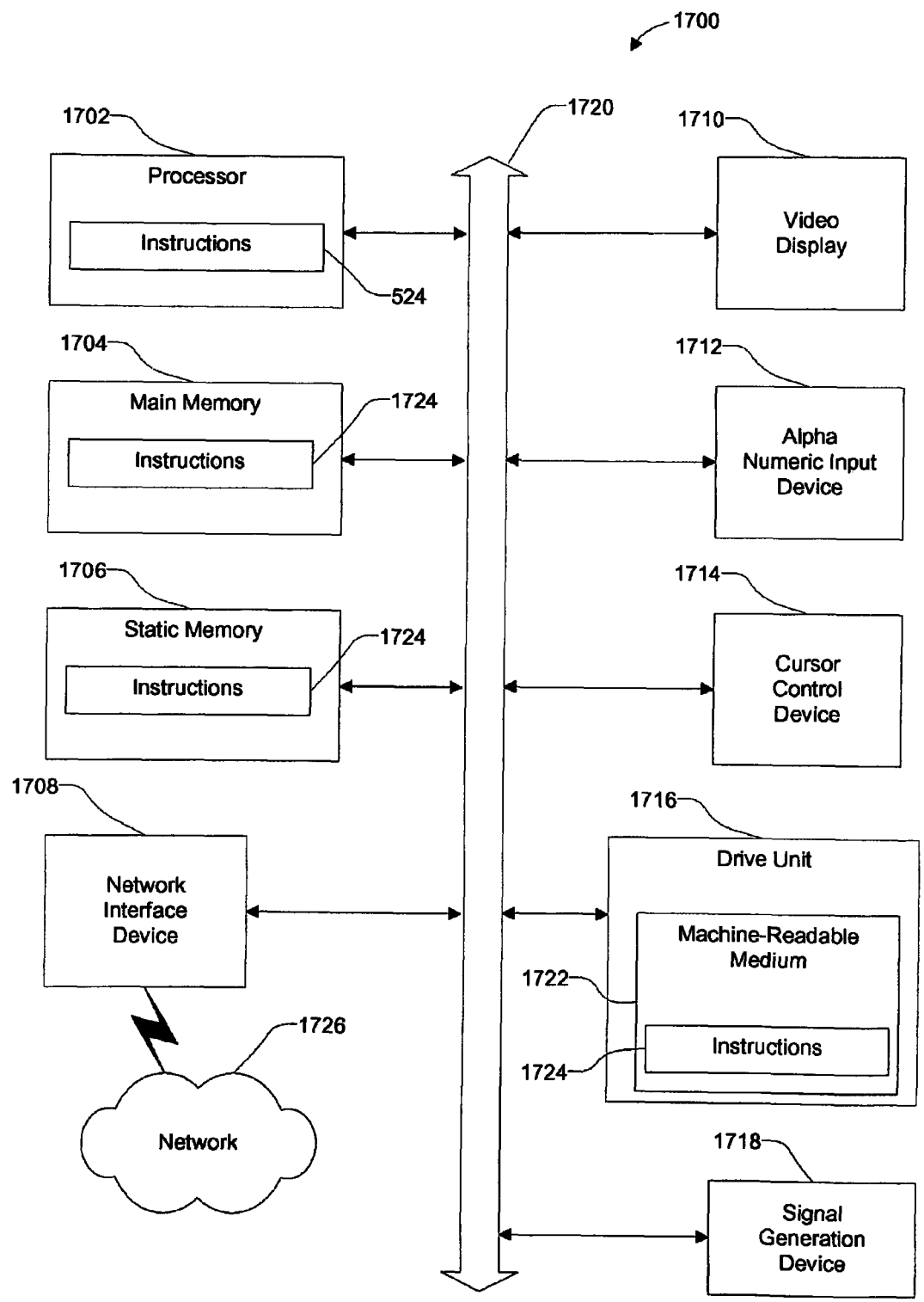
FIG. 17 is a block diagram illustrating an example machine in the example form of a computer system within which a set of instructions, for causing the computer system to perform any one or more of the methodologies disclosed in FIGS. 1-16, may be executed.

FIG. 17 is a block diagram illustrating an example machine in the example form of a computer system 1700 within which a set of instructions, for causing the computer system to perform any one or more of the methodologies disclosed in FIGS. 1-16, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1700 includes a processor 1702 (e.g., a central processing unit (CPU), a graphics processing unit (GPU) or both), a main memory 1704 and a static memory 1706, which communicate with each other via a bus 1708. The computer system 1700 may further include a video display unit 1710 (e.g., a liquid crystal display (LCD) or a cathode ray tube (CRT)). The computer system 1700 also includes an alphanumeric input device 1712 (e.g., a keyboard), a user interface (UI) navigation device 1714 (e.g., a mouse), a disk drive unit 1716, a signal generation device 1718 (e.g., a speaker) and a network interface device 1720.

The disk drive unit 916 includes a machine-readable medium 1722 on which is stored one or more sets of instructions and data structures (e.g., software 1724) embodying or utilized by any one or more of the methodologies or functions described herein. The software 1724 may also reside, completely or at least partially, within the main memory 1704 and/or within the processor 1702 during execution thereof by the computer system 1700, the main memory 1704 and the processor 1702 also constituting machine-readable media.

The software 1724 may further be transmitted or received over a network 1726 via the network interface device 1720 utilizing any one of a number of well-known transfer protocols (e.g., HTTP).

While the machine-readable medium 1722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description In the following description, for purposes of explanation, numerous specific details are set forth in order to provide a thorough understanding of an embodiment of the present invention. It will be evident, however, to one skilled in the art that the present invention may be practiced without these specific details.

What is claimed is:

1. A method comprising:
    connecting a call from a sending device associated with the sender to a receiving device associated with a receiver;
    generating a remittance transaction to transfer funds from an account of the sender to an account of the receiver, the generating of the remittance transaction being initiated by the sender via the sending device through the connected call between the sending device and the receiving device, the generating of the remittance transaction being performed by a processor of a machine;
    notifying the receiver via the receiving device of a secret;
    transmitting the generated remittance transaction to a disbursement agent;
    receiving the secret from the disbursement agent, the secret provided to the disbursement agent by the receiver via the receiving device; and
    transmitting the funds associated with the remittance transaction for disbursement to the disbursement agent based on the secret provided by the sender matching the secret with which the receiver was notified.

2. The method of claim 1, further comprising receiving the secret from the sender via the sending device.

3. The method of claim 1, further comprising generating the secret for the remittance transaction.

4. The method of claim 1, further comprising evaluating the secret with which the receiver was notified for a match against the secret received from the disbursement agent.

5. The method of claim 1, further comprising receiving a completion notification associated with the remittance transaction from the disbursement agent.

6. The method of claim 5, further comprising notifying the sender via the sending device of the completion notification.

7. A system comprising:
    a receiver communication module configured to connect a call from a sending device associated with the sender to a receiving device associated with the receiver;
    a processor configured by a remittance transaction module that configures the processor to generate a remittance transaction to transfer funds from an account of the sender to an account of the receiver, the generating of the remittance transaction being initiated by the sender via the sending device through the connected call between the sending device and the receiving device;
    a remittance notification module configured to notify the receiver via a receiving device associated with the receiver of the remittance transaction and a secret;
    a remittance transaction routing module configured to transmit the generated remittance transaction to a disbursement agent;
    a shared secret module configured to receive the secret from the disbursement agent, the secret provided to the disbursement agent by the receiver via the receiving device; and a funds routing module configured to transmit the funds associated with the remittance transaction for disbursement to the disbursement agent based on the secret received from the disbursement agent matching the secret with which the receiver was notified.

8. The system of claim 7, wherein the shared secret module is configured to receive the secret from the sender via a sending device associated with the sender.

9. The system of claim 7, wherein the shared secret module is configured to generate the secret for the remittance transaction.

10. The system of claim 7, wherein the shared secret module is configured to evaluate the secret with which the receiver was notified for a match against the secret received from the disbursement agent.

11. The system of claim 7, further comprising a notification routing module configured to receive a completion notification associated with the remittance transaction from the disbursement agent.

12. The system of claim 11, further comprising a completion notification module configured to notify the sender via the sending device of the completion notification.

13. A non-transitory machine-readable medium including instructions that, when executed by one or more processors of a machine cause the machine to perform operations comprising:
   connecting a call from a sending device associated with the sender to a receiving device associated with a receiver;
   generating a remittance transaction to transfer funds from an account of the sender to an account of the receiver, the generating of the remittance transaction being initiated by the sender via the sending device through the connected call between the sending device and the receiving device;
   notifying the receiver via the receiving device of a secret;
   transmitting the generated remittance transaction to a disbursement agent;
   receiving the secret from the disbursement agent, the secret provided to the disbursement agent by the receiver via the receiving device; and
   transmitting the funds associated with the remittance transaction for disbursement to the disbursement agent based on the secret provided by the sender matching the secret with which the receiver was notified.

14. The non-transitory machine-readable medium of claim 13, wherein the operations further comprise receiving the secret from the sender via the sending device.

15. The non-transitory machine-readable medium of claim 13, wherein the operations further comprise generating the secret for the remittance transaction.

16. The non-transitory machine readable medium of claim 13, wherein the operations further comprise evaluating the secret with which the receiver was notified for a match against the secret received from the disbursement agent.

17. The non-transitory machine-readable medium of claim 13, wherein the operations further comprise receiving a completion notification associated with the remittance transaction from the disbursement agent.

18. The non-transitory machine-readable medium of claim 17, wherein the operations further comprise notifying the sender via the sending device of the completion notification.

* * * * *